April 25, 1961 W. E. REED 2,981,058
MULTIPLE PRESSURE SENSING, INDICATING AND CONTROL APPARATUS
Filed Sept. 16, 1955 5 Sheets-Sheet 1
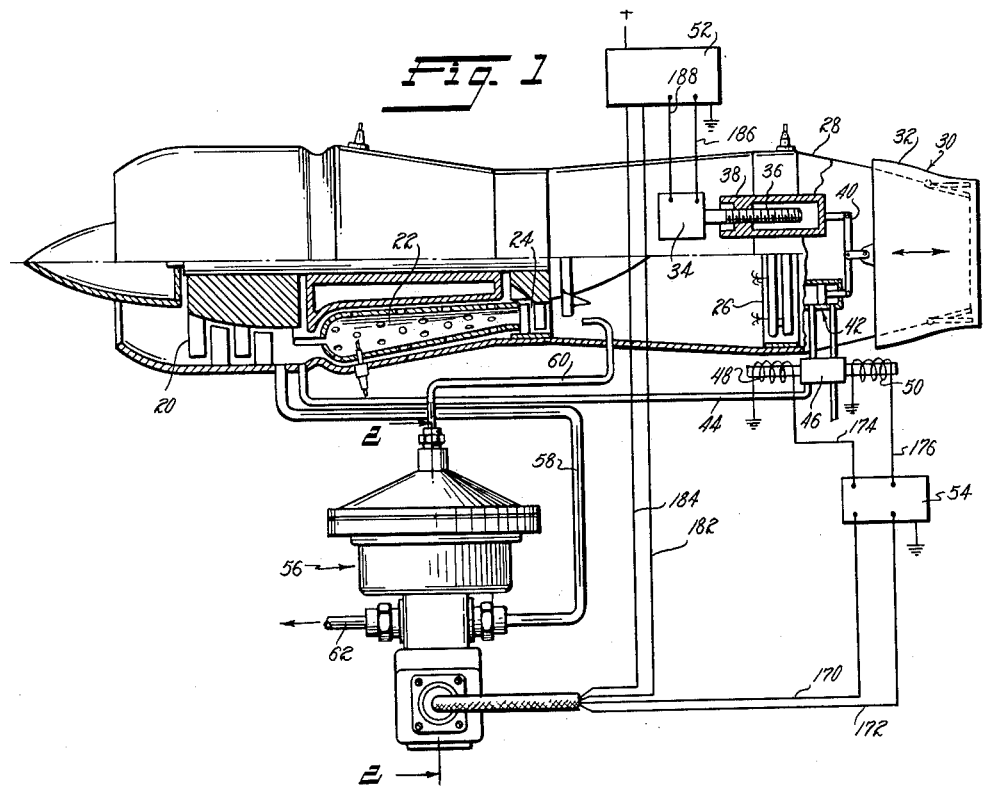
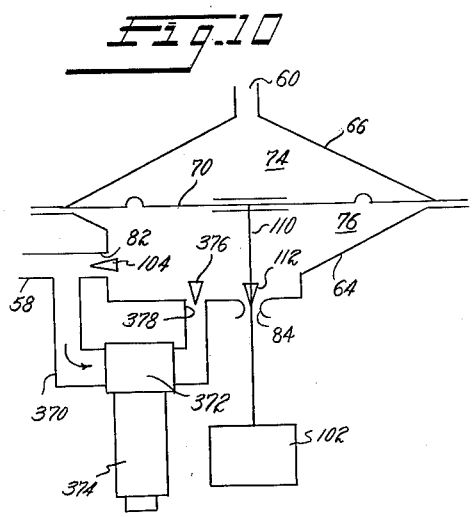
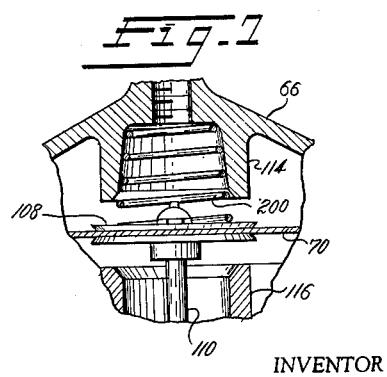
INVENTOR
WENDELL E. REED
BY *Strauch, Nolan & Diggins*
ATTORNEYS

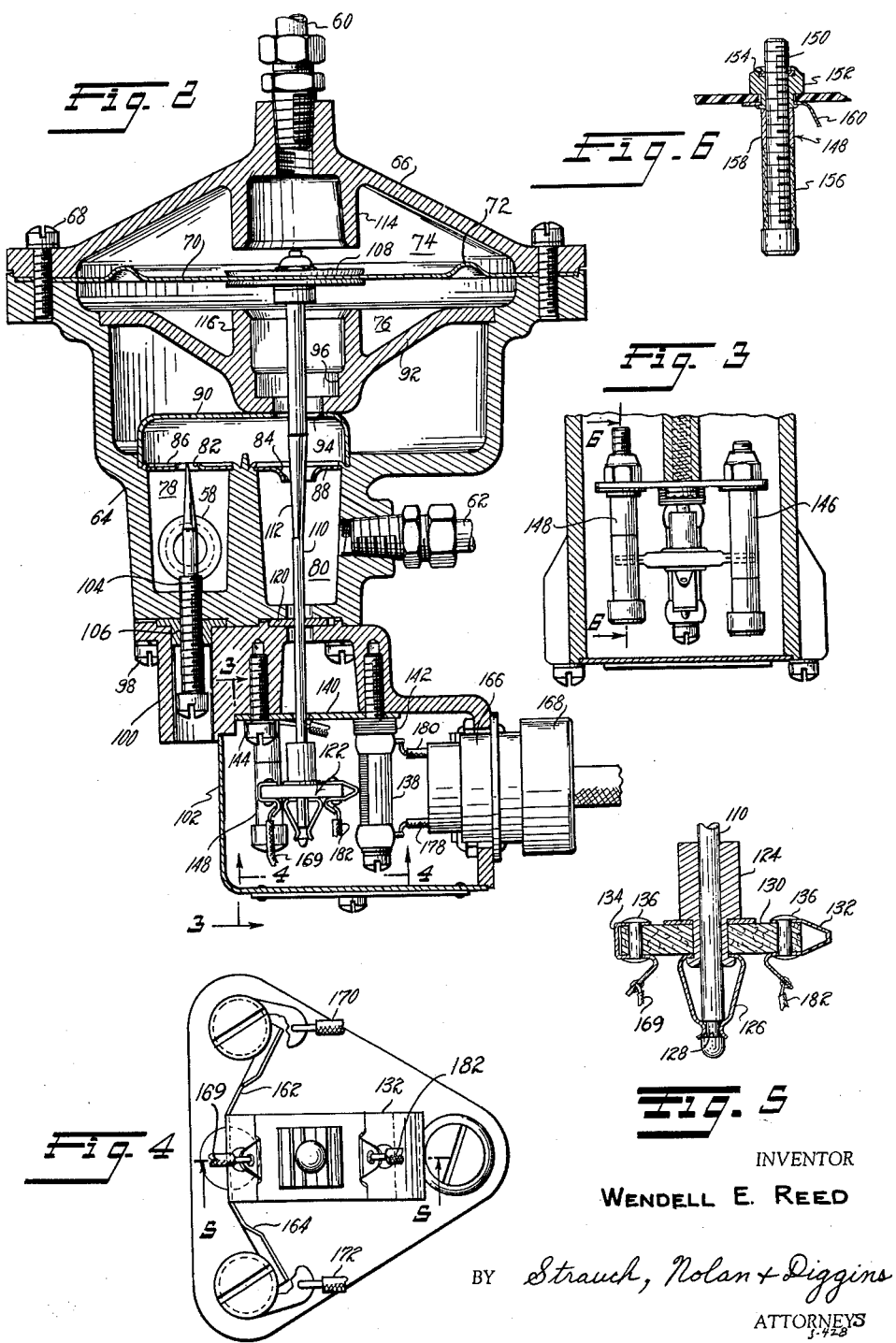

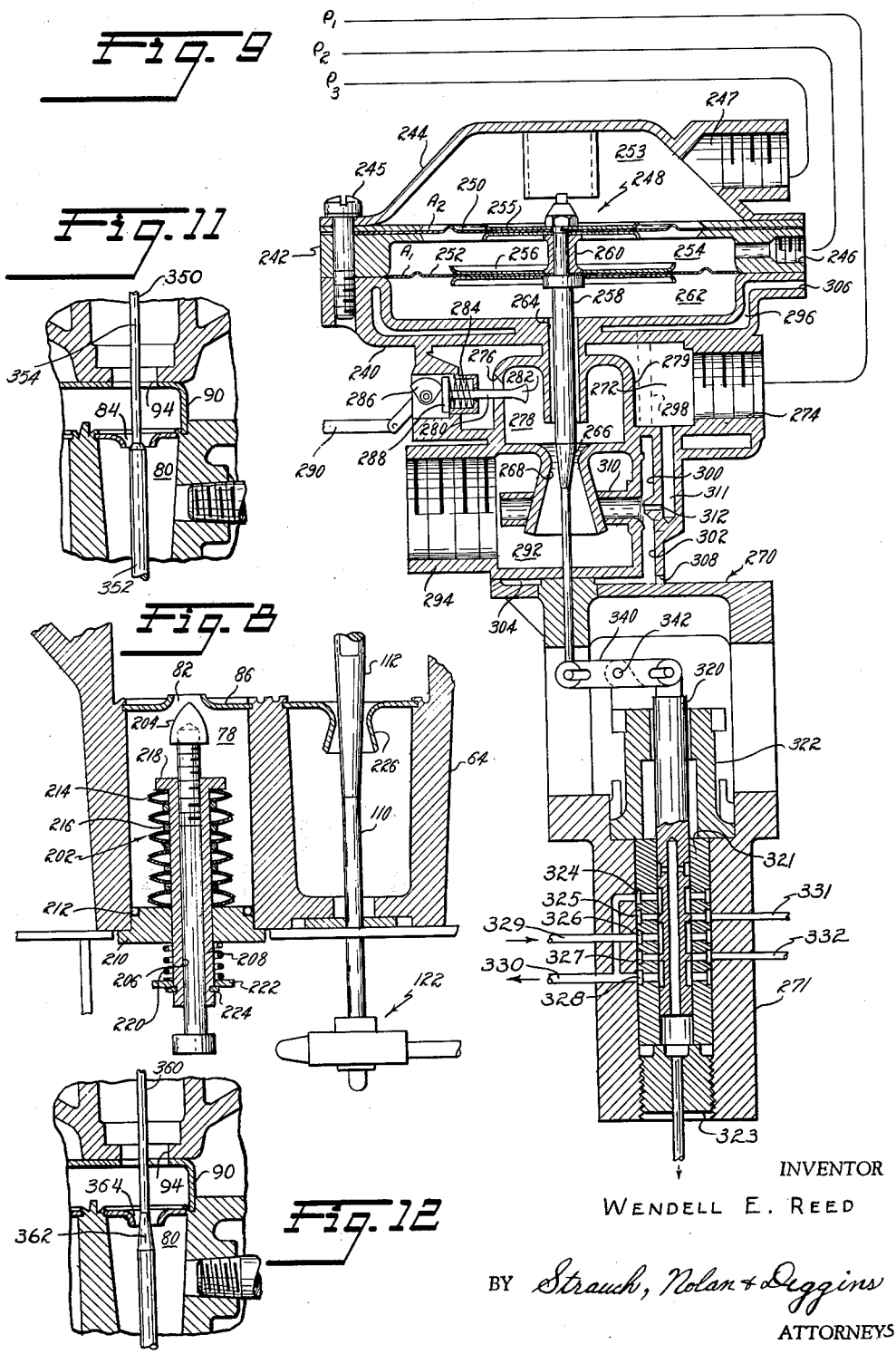

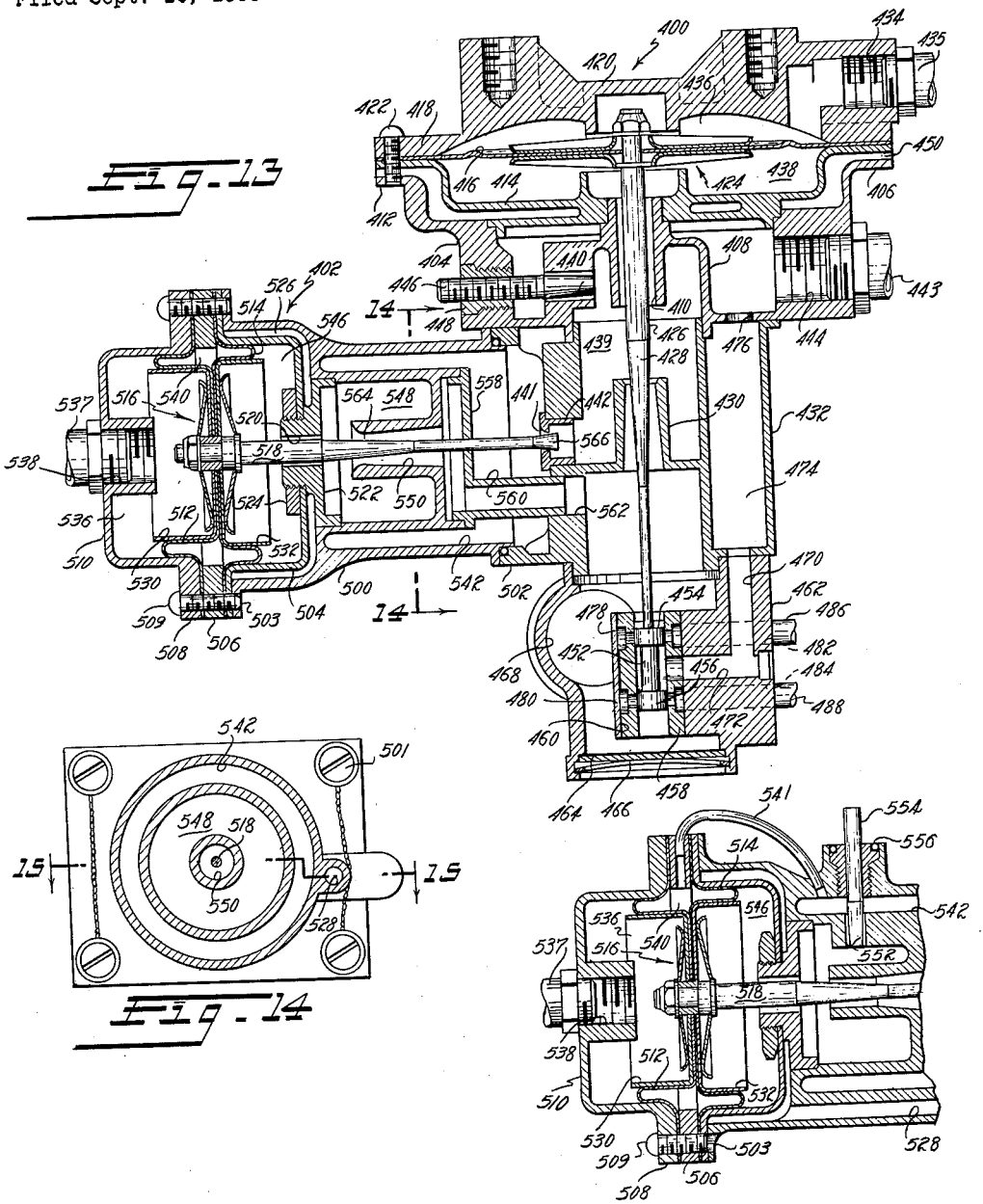

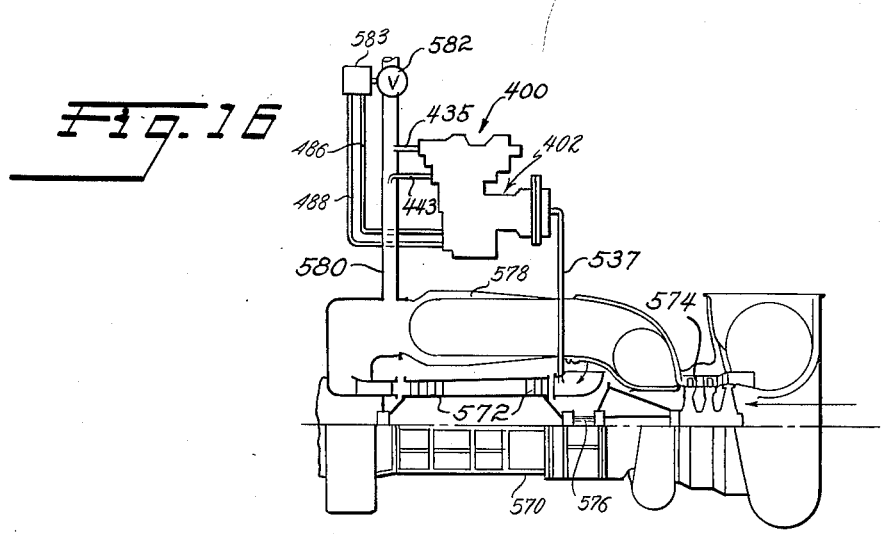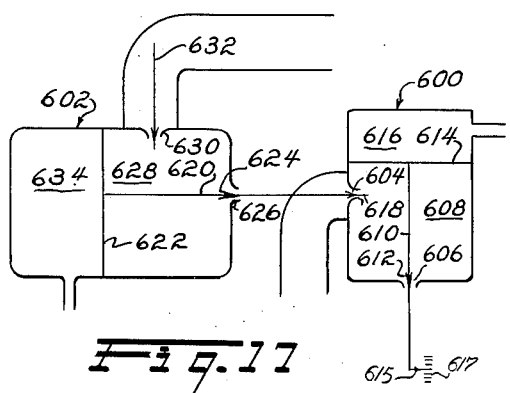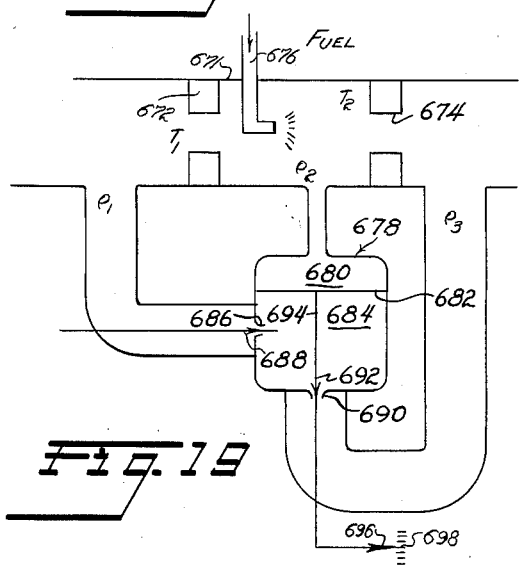

United States Patent Office 2,981,058
Patented Apr. 25, 1961

2,981,058

MULTIPLE PRESSURE SENSING, INDICATING AND CONTROL APPARATUS

Wendell E. Reed, Chula Vista, Calif., assignor to Solar Aircraft Company, San Diego, Calif., a corporation of California Filed Sept. 16, 1955, Ser. No. 534,862

5 Claims. (Cl. 60—35.6)

This invention relates to sensing, indicating and control apparatus and systems. More particularly the invention relates to improved devices responsive to variations in the properties and characteristics of fluids flowing in such systems as gas turbines, reaction engines, chemical processing apparatus, pipe lines, wind tunnels and the like, and to systems for the control thereof.

For purposes of illustration the subject invention will be disclosed as applied primarily to the control of a component of a turbojet engine, since such an engine is a fluid flow system typical of the hundreds of such systems to which the invention may be applied. This illustration has been chosen because it is generally regarded to present unusually difficult problems in the field of sensing, indicating and control because of the high velocity of the fluid flow, the great change in temperatures and pressures of the fluid within the system and the wide range of environmental conditions in which the system operates. It is to be understood and will be apparent from the following description that the present invention is inherently of broad application and may be utilized successfully in other fluid flow systems.

In a preferred embodiment of the device the invention comprises a flow chamber having at least one inlet orifice and one outlet orifice, one or more of the orifices having a controlled effective area, a diaphragm or similar pressure responsive element exposed on one side to the pressure developed in the flow chamber between the orifices, a control needle or equivalent control element effective to vary area of one of the orifices as a function of the displacement of the diaphragm, and finally a device for converting the motion or position of the diaphragm into a useful signal to sense, indicate or control a condition or characteristic of a given fluid flow system.

The invention may also be characterized as a fluid flow duct which is the analog of another duct, which may be a part of the primary system to be controlled or measured, or an independent duct associated with the primary duct.

By suitable variations in the characteristics of the orifices, by control of the orifices in response to dynamic or static conditions, by proper selection and control of biasing forces applied to the diaphragm and by proper utilization of the output signal produced by the unit in the form of a mechanical displacement, the units of the present invention may be utilized in a wide variety of industrial and military applications.

It is, accordingly, the primary purpose and object of the present invention to provide novel pressure responsive units for sensing, indicating or controlling one or more quantities or conditions of a fluid flow system, and novel control systems utilizing said units.

It is a further object to provide such units which are substantially unaffected or affected only to a desired extent by changes in environmental conditions and which thereby provide a desired response under widely varying conditions.

It is a further object to provide novel pressure sensitive sensing, indicating and control units which are substantially insensitive to acceleration forces, vibration, temperature gradients and other operating conditions such as those encountered in aircraft.

It is another object of the present invention to provide novel pressure sensitive sensing, indicating and control devices which have high sensitivity, uniform accuracy, and extremely rapid response.

It is an additional object of the present invention to provide novel pressure sensitive, sensing, indicating and control devices which are of simple construction and are thus dependable in operation and require little maintenance and are of low cost and light weight, and novel systems for their utilization.

It is also an object of the present invention to provide novel pressure sensitive, sensing, indicating and control devices which lend themselves to ready modification to provide a wide variety of response and output signals and which thus have a versatility heretofore unknown in the art.

Further objects will become apparent from the following description and dependent claims considered in connection with the accompanying drawings, in which:

Figure 1 is a partly schematic view of a preferred form of the invention as applied to a jet engine equipped with an afterburner and a fully variable nozzle;

Figure 2 is an enlarged vertical section of the control unit employed in the system of Figure 1 taken along line 2—2 of Figure 1;

Figures 3 and 4 are enlarged sectional views taken along lines 3—3 and 4—4 of Figure 2, respectively, illustrating details of construction;

Figure 5 is an enlarged sectional view taken along line 5—5 of Figure 4;

Figure 6 is an enlarged sectional view taken along line 6—6 of Figure 3;

Figure 7 is a fragmentary sectional view of a modified control unit of the present invention;

Figure 8 is an enlarged fragmentary section of a further modification which may be incorporated in the control unit of Figure 2;

Figure 9 is a sectional view of a modified control unit and signal generator also showing an arrangement for cooling certain components of the device;

Figure 10 is a diagrammatic representation of a further form of the invention;

Figures 11 and 12 are fragmentary sectional views of modified forms of certain of the components of the units illustrated in the previously described figures;

Figure 13 is a central section of a further modification of the invention;

Figure 14 is a fragmentary sectional view taken along line 14—14 of Figure 13;

Figure 15 is a fragmentary sectional view taken along line 15—15 of Figure 14;

Figure 16 is a diagrammatic view of a typical system utilizing the unit of Figures 13, 14 and 15;

Figure 17 is a diagrammatic view of a further modification of the invention for performing multiplication and division;

Figure 18 is a diagrammatic view of a further form of the invention for performing differentiation; and Figure 19 is a diagrammatic view of a system which effectively measures or indicates temperature ratios in a duct.

Before considering in detail the several structural forms of the invention illustrated in the drawings certain basic considerations upon which their operation depends will be discussed.

As stated above, the invention includes a flow chamber having at least two orifices in series through which fluid flows. The pressure developed in the flow chamber between the orifices is applied to one side of a diaphragm or similar pressure sensitive element to the other side of which is applied a pressure or pressure equivalent. The term "pressure equivalent" as used throughout the specification and claims refers to any static or dynamic force or any combination of such forces applied to the diaphragm, which, when divided by the effective area of the diaphragm, assumes dimensions of pressure.

The position of the diaphragm is thus a function of the relation of the pressure in the flow chamber and the applied pressure equivalent. The displacement of the diaphragm is converted by suitable mechanical or electrical means into an output signal which may be used to operate indicating, measuring, sensing or control apparatus. To date the present invention has achieved its greatest utility as an element of a system for controlling one or more of the characteristics or properties of fluid flowing in a separate system. When the invention is so used the condition or characteristic of the fluid to be controlled is converted, if necessary, to a pressure equivalent and applied to the side of the diaphragm remote from the flow chamber. When the desired conditions obtain in the system to be controlled, the pressure or pressure equivalents bear a predetermined relation to the pressure developed in the flow chamber. When the condition or characteristic of the fluid to be controlled departs from a predetermined desired value the diaphragm or equivalent pressure sensitive element is displaced by the difference between the new pressure equivalent which reflects the change in the condition to be controlled and the pressure in the flow chamber thus immediately producing a signal effective to reestablish the desired condition in the system to be controlled.

At least one of the restrictions or orifices in series in the flow chamber is generally a nozzle which may be defined for present purposes as a restriction so formed that when a compressible fluid is flowing and when the ratio of throat or exit pressure to entrance pressure is less than a so-called critical ratio (roughly .53 for air), sonic velocity is attained at the throat. Under these conditions the mass discharge is independent of the value of downstream pressure. As explained hereinafter the nozzle employed in the flow chamber may be convergent, convergent-divergent or of other forms depending upon the characteristics required in a particular installation.

The restrictions may be fixed or adjustable and in most cases the second or downstream restriction is a nozzle operating under critical discharge conditions which may be maintained if necessary with a vacuum pump. However it will be appreciated as the description proceeds that it is not always necessary that one or both of the restrictions operate at critical discharge conditions. Whether or not critical discharge is required depends solely on the application of the device.

To facilitate an understanding of the principles of operation of the subject invention, reference will now be had to the approximate equations of gas flow through orifices and nozzles.

For a given nozzle:

$$W_{a_n} = K \frac{P_i a_n}{\sqrt{T_i}} N \qquad (1)$$

where $W_{a_n}$ is the gasflow through the nozzle, $K$ is a dimensional constant, $P_i$ is the inlet pressure to the nozzle, $a_n$ is the effective flow area of the nozzle, $T_i$ is the total temperature of the air entering the nozzle, and $N$ is a function of the ratio between the inlet pressure, $P_i$ and the discharge pressure, $P_o$.

For two nozzles operating in series:

$$W_{a_{n_1}} = W_{a_{n_2}} \qquad (2)$$

for steady-state operating conditions, where $$w_{a_{n_1}}$$

is the airflow through the first restriction, and $$w_{a_{n_2}}$$

is the airflow through the second restriction.

Equating the two airflows in Equation 1, we have:

$$K_1 \frac{P_{i_1} a_{n_1}}{\sqrt{T_{i_1}}} N_1 = K_2 \frac{P_{i_2} a_{n_2}}{\sqrt{T_{i_2}}} N_2 \qquad (3)$$

where $P_{i_1}$ is the pressure entering the first nozzle, $P_{i_2}$ is the pressure entering the second nozzle, $a_{n_2}$ is the effective flow area of the second nozzle, and $a_{n_1}$ is the effective flow area of the first nozzle.

If there is no heat transfer:

$$T_{i_1} = T_{i_2} \qquad (4)$$

therefore:

$$\frac{P_{i_1}}{P_{i_2}} = \frac{K_2 a_{n_2} N_2}{K_1 a_{n_1} N_1} \qquad (5)$$

if the second nozzle is operating at critical discharge, i.e. if $P_{i_2}/P_{o_2}$ is greater than 0.53, $N_2=1$; and since $N_1$ is a function of the ratio of the two inlet pressures, $P_{i_1}/P_{i_2}$, this ratio is substantially a function only of the effective areas of the restrictions, i.e., $$\frac{p_{i_1}}{p_{i_2}} = f\left(\frac{a_{n_2}}{a_{n_1}}\right) \qquad (6)$$

if both nozzles are choked, then both $N_1$ and $N_2 =$ unity, and:

$$\frac{p_{i_1}}{p_{i_2}} = \frac{K_2 a_{n_2}}{K_1 a_{n_1}} \qquad (7)$$

Equation 7, in effect, states that the pressure ratio across the first restriction is inversely proportional to the area ratio of the two restrictions.

As used herein, the term "controlled reference pressure" ($P_r$), refers to the intermediate pressure between the two restrictions, which is also the entrance pressure ($P_{i_2}$) of the second restriction.

If the diaphragm and attached movable mechanism is considered as a free body, and if the controlled reference pressure is applied to one side of the diaphragm and other arbitrarily selected forces are applied to oppose it, and equation for the equilibrium of this free body can be written. Assuming these forces are all colinear, this equation is:

$$p_r A_{ef} + \Sigma F = 0 \qquad (8)$$

in which $A_{ef}$ is the effective area of the diaphragm and $\Sigma F$ represents the summation of all other forces acting on the free body.

Equation 8 may be rearranged to give:

$$p_r + \frac{\Sigma F}{A_{ef}} = 0 \qquad (9)$$

The term $\Sigma F/A_{ef}$ has dimensons of pressure, i.e. force per unit area, and is defined as the "applied pressure equivalent," $\Sigma P_e$.

Substituting in Equation 9, $$p_r = -\Sigma P_e \qquad (10)$$

Letting $P_r = P_{i_2}$, and substituting Equation 10 in Equation 5, and rearranging:

$$\frac{1}{a_{n_2}} = -\frac{1}{a_{n_1}} \frac{K_2}{K_1} \frac{N_2}{N_1} \frac{\Sigma P_e}{P_{i_1}}$$

It is an important feature of the preferred forms of the invention that the reference pressure is controlled as a function of the position of the diaphragm or equivalent pressure sensitive element. This is preferably accomplished by providing a nozzle control element attached to and movable with the diaphragm which effectively changes the area of one of the restrictions (preferably the second) as the diaphragm is moved. Thus the effective area of the controlled restriction is a function of the displacement of the diaphragm. If $y$ is the displacement of the diaphragm, the area of the controlled restriction may be expressed as follows:

$$\frac{1}{a_{n2}} = f(y) \tag{12}$$

The precise relation between the displacement of the diaphragm and the effective area of the controlled restriction is determined in practice by the shape of the control element which is movable with the diaphragm and may be varied rather widely to suit the requirements of a particular application.

The flow chamber pressure may also be regulated by controlling the area of the other restriction, for example, through the use of a contoured element or needle extending into the orifice. If $x$ is the displacement of the needle or contoured element controlling the area of the first orifice, the area of this orifice may be expressed as follows:

$$\frac{1}{n_1} = g(x) \tag{13}$$

In practice the relationship between the position of the needle and the area of the first restriction is determined by the shape of the needle in accordance with the requirements of the particular application.

$$f(y) = g(x) \frac{K_2}{K_1} \frac{N_2}{N_1} \frac{\Sigma^P e}{P_{i_1}} \tag{14}$$

This is the general equation describing the preferred form of the present invention which states, in effect, that the output displacement ($y$) is a function of a pressure ratio, $$\frac{\Sigma^P e}{P_{i_1}}$$

an input displacement $x$ and, when $N_2$ is less than 1, the discharge pressure of the second orifice.

While in Equation 14 the values of $N_2$ and $N_1$ may be taken as unity in most cases since both restrictions are ordinarily operated at critical discharge, there are specific cases where sub-critical discharge is used. In this general equation the terms $f(y)$, $g(x)$ and $\Sigma Pe$ are not specifically defined and may be varied within wide limits to suit the requirements of the particular installation thus making the units of the present invention extremely versatile and of wide utility and application. For example, $f(y)$, may be $y$, $y^2$, log $y$, the integral of $y$, the differential of $y$ or any other desired function of $y$. The same is true of $g(x)$.

The functions are determined by the shape of the contoured elements which control the area of the respective orifices and by the method by which the motion of the control elements is converted to an area change. Thus, virtually any type of characteristic equation may be solved by substituting the appropriate values for the terms in the general equation.

In the following description several examples of specific mechanical arrangements for varying these functions will be given. Also examples of individual pressure equivalents will be described in detail. It may be stated here that these forces include pressure forces acting on the diaphragm, spring forces, inertia forces, etc.

Referring now more specifically to the drawings, Figure 1 illustrates the application of a unit in accordance with the present invention to the control of a turbo-jet engine, an engine of this type being representative of a typical fluid flow system with which the invention has been used with marked success. This type of flow system has been selected for purposes of illustration not only because of its importance but because it presents unusually difficult problems of control principally because of the wide and rapid variations in the mass, temperature and velocity of the fluid flowing through the system and because of the wide range of environmental conditions encountered in operation. In the particular application shown in Figures 1 through 7 the invention provides a control signal effective to maintain the turbine pressure ratio at a constant value. In broader terms, the unit effectively maintains one pressure at a constant ratio with another.

The turbo-jet engine illustrated in Figure 1 is of conventional construction and includes the usual compressor 20, a primary burner 22, the turbine 24, an afterburner 26 mounted in a tail pipe 28 and a continuously variable area nozzle assembly 30 which may be of any known design.

The details of the controls for the primary engine and the afterburner fuel supply have been omitted for clarity and may take any of a number of conventional forms.

The area of the nozzle 30 is varied by movement of a shroud 32 axially of the engine, movement toward the left as viewed in Figure 1 decreasing the size of the nozzle and movement toward the right increasing the size of the nozzle. Vernier movement is effected by means of a reversible motor 34, the drive shaft 36 of which moves a traveling nut 38 connected to the shroud 32 through a suitable linkage including lever 40. Rapid and major displacements of the nozzle are effected through a pneumatic power mechanism indicated generally at 42 also connected to the common lever 40. Operating fluid for the power mechanism 42 is bled from the compressor discharge through a conduit 44 and supplied selectively to the opposite ends of the power piston by a valve 46 actuated by solenoids 48 and 50. Actuating signals are supplied through amplifiers 52 and 54 to the motor 34 and the valve 46, respectively, by the control unit indicated generally at 56 with which the present invention is primarily concerned.

This unit is dynamically connected to the jet engine through a conduit 58 to compressor discharge and through a conduit 60 to the turbine discharge. Conduit 62 (rotated 90° from its actual position) leads to any low pressure area of the aircraft preferably an area where atmospheric pressure prevails.

As best shown in Figure 2 the unit 56 includes a main body member 64 and a cover member 66, preferably of die cast aluminum, which have mating circular flanges secured by a plurality of screws 68. Sealingly secured between the mating flanges of the members 64 and 66 is a circular diaphragm 70, preferably fabricated of silicone laminated fiber glass, which is highly flexible, has negligible resistance to bending, is durable, and is essentially non-stretchable. An annular roll 72 is usually formed in the diaphragm to permit movement of the center of the diaphragm through the desired range. Diaphragm 70 divides the unit 56 into an upper chamber 74 to which the pressure to be controlled is supplied through the pipe 60 and a lower chamber 76. The body member 64 is provided with two secondary chambers 78 and 80 connected, respectively, to the compressor discharge pressure through conduit 58 and to ambient pressure through conduit 62. The chambers 78 and 80 communicate at their upper ends with the chamber 76 through orifices 82 and 84 formed, respectively, in sheet metal plates 86 and 88 which are held in place by peening the upper edge of the chambers 78 and 80. A sheet metal deflector 90 is provided to direct the flow from orifice 82 toward orifice 84 to prevent heat loss and to minimize turbulence within the device. The deflector 90 is supported by a die cast aluminum annulus 92 and the pressure developed between the orifices 82 and 84 is transmitted to the chamber 76 through registering passages 94 and 96 formed in the deflector 90 and the annulus 92.

Secured to the lower end of the body member 64 as by bolts 98 is a secondary die cast aluminum housing 100 which is closed by a sheet metal cover plate 102. An adjusting needle 104, by which the area of orifice 82 may be adjusted, is threaded into housing 64 and locked by a Teflon sleeve 106 secured between the housings 64 and 100.

Rigidly secured to the diaphragm 70 by a conventional sealing nut and washer assembly indicated at 108 is a needle 110 preferably made of stainless steel or nickel plated brass having a tapered control portion 112 and having a total taper angle of 6° in a typical installation. The tapered portion of the needle is positioned within the orifice 84 throughout the range of movement of the needle 110 permitted by the hollow bosses 114 and 116 formed in the cover plate 66 and the annulus 92, respectively.

The position of the control portion 112 of the needle within orifice 84 and consequently the area of orifice 84 is determined by the respective pressures in chambers 74 and 76 acting on opposite sides of the diaphragm 70.

Below tapered portion 112, a uniform section of needle 110 extends through a floating seal 120 preferably of graphite clamped between the housings 64 and 100. The lower end of the needle 110 within housing 100 carries a wiper assembly indicated generally at 122 and illustrated on enlarged scale particularly in Figures 3, 4 and 5. The wiper assembly is supported on the lower end of needle 110 by means of an aluminum sleeve 124 and is held in place by a clip 126 the free ends of which engage an annular recess 128 at the lower end of the needle. Mounted on the sleeve 124 is a rectangular insulating block 130 of silicone fiber glass laminate. Wiper contacts 132 and 134 are secured by rivets 136 to the opposite ends of block 130. The wiper 132 rides over the surface of a potentiometer 138 which extends through a silicone fiber glass laminate base plate 140 and is threaded into a boss in the housing 100. The position of the potentiometer 138 may be adjusted by the addition or removal of shims 142. The base plate 140, which is also held in place by an additional screw 144 carries a pair of contacts 146 and 148, contact 148 being shown on enlarged scale in Figure 6.

The contact 148 includes a contact post 150 threaded into a self-locking clinch nut 152 mounted on the base plate 140, the clinch nut having a fiber friction lock insert 154. Sleeved over the post 150 and held in place between the head of the post and the base of the clinch nut are fiber insulating sleeve 156 and a silver contact sleeve 158. The contacts 146 and 148 are identical except that on the contact 148 the position of the sleeves 156 and 158 is reversed. Each of the contacts carries a terminal clip 160.

The wiper contact 134 has two spring arms 162 and 164 which yieldingly ride over the surfaces of the contacts 146 and 148, respectively. The spring arms may be bent slightly if required to provide uniform contact pressures on the contacts 146 and 148 and the potentiometer 138 thus centering the needle.

The leads from the contactors 146 and 148, from the wipers 132 and 134 and from the potentiometer are connected to a standard connector 166 mounted in the housing 100 and adapted to receive a connector plug 168 leading to the nozzle actuating units.

The contact wiper 134 is connected through a lead 169 to a suitable source of potential not shown. Accordingly when the needle 110 is moved to its extreme positions into contact with the conducting sleeves of either the contact 146 or the contact 148 a signal is transmitted to the amplifier 54 through one of the leads 170 and 172 thus energizing either one of the coils 48 and 50 through leads 174 and 176 connected to the output side of the amplifier, moving the valve 46 to signal full open or full closing of the nozzle depending upon the direction of movement of the needle 110. However, except during initiation or cessation of afterburning, the wiper 134 will be out of contact with the conducting portions of contacts 146 and 148 and vernier trim of the nozzle will be effected through motor 34 by travel of the wiper 132 over the potentiometer 138 which with its leads 178 and 180 forms a part of a Wheatstone bridge circuit not shown. The wiper 132 is connected directly to amplifier 52 through lead 182 and the opposite side of the Wheatstone bridge is connected to the amplifier through lead 184. The output side of the amplifier is connected to the reversing fields of motor 34 through leads 186 and 188. Accordingly, movement of the contact 132 along the potentiometer from its present neutral position increases either the voltage applied through lead 182 or lead 184 with respect to the other thus revolving the motor 34 in one direction or the other effecting vernier adjustment of the nozzle position.

It will be apparent to those skilled in the art that the circuit may be replaced by other circuits which will actuate the solenoids 48 and 50 upon full travel of the needle 110 and will cause motor 34 to revolve in opposite directions upon displacement of the wiper 132 in opposite directions from its neutral position. It will also be apparent that through the use of conventional circuitry the afterburner fuel and ignition controls for the primary engine or the afterburner can be made operative in response to predetermined movements of the needle 110. Through conventional circuitry the unit 56 may also control a two-position nozzle.

The unit just described is calibrated by adjustment of the needle 104 when the unit is attached to a specific power plant. More specifically, at the time of installation the turbo-jet engine is brought to full military r.p.m. with the exhaust nozzle adjusted to a nominal closed position at which time the desired turbine pressure ratio is obtained. It will be understood that the leads 170, 172, 182 and 184 are disconnected at that time. Then by suitable adjustment of the position of the needle 104 the effective area of the first orifice 82 is adjusted until the diaphragm 70 and the needle 110 occupy their neutral or null position. Once so adjusted the effective throat areas of the first and second orifices are in a predetermined relationship to the effective areas of the turbo-jet turbine nozzle and the exhaust nozzle. It will be seen that the area of the turbine nozzle of the turbo-jet engine is in effect fixed and that the area of the first orifice 82 is similarly fixed once the needle 104 is adjusted. The area of the exhaust nozzle 30 of the turbo-jet engine is variable and is changed by opening or closing the nozzle and the area of the second orifice 84 is similarly variable and is changed by movement of the tapered portion 112 of the needle with respect to the throat of the orifice 84. Thus the unit of the present invention forms a secondary flow system which in the present instance is in parallel with a primary flow system the turbo-jet engine. Since the turbine passage and the variable nozzle 30 of the primary flow system have the same dynamic character as the orifices 82 and 84 and since the systems are connected in parallel to the some inlet and outlet pressures their dynamic behavior in accordance with the equations given above will be the same under all operating conditions. In the present instance it is not necessary that either of the orifices 82 or 84 operate at their critical ratios. It is necessary only that they operate under dynamic conditions similar to those under which the equivalent nozzles operate in the primary flow system.

In operation the diaphragm 70 remains at rest as long as the turbine discharge pressure in chamber 74 is exactly equal to that of the modulating pressure in chamber 76 and therefore in optimum ratio with the compressor discharge pressure. However, when the pressure in chamber 74 deviates from the established optimum pressure in chamber 76, the diaphragm 70 and the needle 110 are moved toward the low pressure area. If the needle 110 were not provided with the tapered control section 112 in the region of orifice 84 the displacement of the diaphragm would continue until physically interrupted. However, as the needle is displaced the size of orifice 84 is changed and the needle comes to rest when the size of the orifice 84 has been sufficiently altered to establish the pressure in chamber 76 to the exact value of the pressure in chamber 74. This movement of the needle causes a corresponding displacement of the contact 132 along the potentiometer 138 which, in the case of a drop in turbine discharge pressure, activates the motor 34 in a direction to move the variable area nozzle 30 towards closed position. The amount of deflection of the diaphragm 70 and needle 112 and the amount of resulting change in the area of the orifice 84 are directly proportional to the error existing in the turbine discharge pressure with respect to the compressor discharge pressure and thus afford a direct indication of the corresponding change in nozzle area required to restore the turbine discharge pressure to normal. The diaphragm and needle will remain displaced as long as error exists in the turbine discharge pressure. However, since displacement of the needle produces a corrective signal, correction of the error in turbine discharge pressure is initiated immediately upon displacement of the needle from its neutral position. As the nozzle moves toward a corrected position and the turbine discharge pressure returns to the desired value, the pressure in chamber 74 changes to return the diaphragm to neutral position. When the neutral or null position is reached the area of orifice 84 is restored to normal thus stabilizing the diaphragm in the original normal position where the contactor 132 occupies a neutral position with respect to the potentiometer 138. It will be understood that although the control device returns to its original position the nozzle 30 will occupy a corrected position.

Since the correction of turbine discharge pressure and the movement of the diaphragm 70 and the tapered needle portion 112 take place simultaneously and at substantially the same rate, over compensation, hunting and resilient or pendulum action are eliminated and the needle has little tendency to move past its balanced point.

By sensing pressure directly the apparatus of the present invention provides immediate signals and the nozzle area is corrected before other variables are seriously affected.

While the above-described functions are predicated on more or less minor variations in turbine discharge pressure, essentially the same action takes place upon major variations in turbine discharge pressure such as, for example, those occasioned by afterburner light-off or blowout. In this event the diaphragm is displaced rapidly until the contact wiper 134 contacts one of the uninsulated portions of the contacts 146 and 148 thus activating the power mechanism 42 for rapidly moving the nozzle either toward fully open or fully closed position. Final trimming action is accomplished through the agency of the motor 34.

Regardless of the magnitude of pressure change and regardless of the altitude, air-speed, r.p.m. or ambient temperature the diaphragm deflection is always a function of the error in nozzle area and the difference between the actual pressure ratio and the desired normal pressure ratio.

It is desirable in a jet engine to render the control unit non-responsive to minor transient variations in turbine tail-pipe pressures and accordingly a "dead band" is ordinarily incorporated in the circuit. This "dead band" normally renders the unit insensitive to departures of plus or minus .25% from the normal absolute tail-pipe pressure. The dead band may be established by rendering the amplifier insensitive to a predetermined minimum voltage differential.

The above described action of the unit of Figure 2 can be further explained and substantiated by references to the equations given above. To facilitate the explanation reference will be first made to the action of the device of Figure 2 assuming that the leads 182, 184, 170 and 172 are disconnected. When this is done the unit will function as an indicator rather than a controller.

For purposes of explanation it may be assumed that both orifices are choked so that both $N_1$ and $N_2$ in Equation 14 are unity. Since the position of the needle 104 is not changed during operation $g(x)$ is a constant, for example, $C_1$. Neglecting any inertia load, $P_2$ is the only equivalent pressure applied to the diaphragm so that $\Sigma Pe$ equals $P_2$. By substitution into Equation 14 the following equation is obtained:

$$f(y) = C_1 \frac{K_2}{K_1} \frac{P_2}{P_1} \qquad (15)$$

Since the effective area of the second orifice 84 is controlled by the tapered section 112 of the needle 110, Equation 12 becomes $$Ky = \frac{1}{a_{n_2}} = f(y)$$

where K is a constant related to the taper on the needle. Substituting this value of y into Equation 15 the following equation is obtained:

$$y = \frac{C_1}{K} \frac{K_2}{K_1} \frac{P_2}{P_1} \qquad (16)$$

Thus, to the extent that $C_1/K$ and $K_2/K_1$ are constants, y, the displacement of the needle, is proportional to $P_2/P_1$. Since, in the example given, $P_2$ is the turbine discharge pressure and $P_1$ is the compressor discharge pressure, the displacement of the needle 110 will provide a direct indication of the existing turbine pressure ratio. As $P_2$ changes in operation, the needle 110 will be displaced and will move until the flow chamber pressure balances the new $P_2$. When this state is reached the needle will again be in equilibrium but at a new position which indicates the new pressure ratio. Through suitable calibration this form of the present invention will find application in a number of fields. For example, it may be used to indicate Mach number or gas flows in ducts and passages or the pressure ratio across an orifice or valve.

Let it be assumed now that the leads 170, 172, 182 and 184 are connected so as to impart to the unit the above-described control function. When so connected the unit has a single equilibrium position and it may be termed a null balance system. The equilibrium position will be the position at which the control unit is in the dead band position. For this position the following relation will be satisfied.

$$f(y) = y = \frac{K_2}{a_{n_2}} = C_2 \qquad (17)$$

Equation 16 then becomes:

$$\frac{P_2}{P_1} = C_3 \frac{K_1}{K_2} \qquad (18)$$

where $C_3$ equals $C_2/C_1$. To the extent that $K_1/K_2$ and $C_3$ are constants, $P_2/P_1$, in the present instance the turbine pressure ratio, will be a constant.

As suggested above the term "applied pressure equivalent" which is effective on the side of the diaphragm 70 remote from chamber 76 may comprise mechanical as well as fluid pressure components, if desired, to produce a particular type of response or control signal. This is accomplished in the unit shown in Figure 7 which is identical to the unit previously described in connection with Figure 2 except that it incorporates a coil spring 200 which is compressed between the bottom of the boss 114 and the upper surface of the nut and washer assembly 108 so that the pressure equivalent of the spring effectively augments the pressure equivalent of the fluid pressure supplied through the conduit 60. An excellent illustration of the operation and utility of this form of the invention is found in connection with the operation of turbo-jet engines such as that shown in Figure 1 at altitudes in excess of 40,000 feet. It has been found that at such altitude the maintenance of turbine pressure ratio at a constant value results in an undesirable increase in turbine inlet temperature because of Reynolds number effects which increasingly deteriorate compressor efficiency at altitudes above 40,000 feet. It has also been found that the most effective compensation for loss of compressor efficiency at high altitudes is effected by increasing the turbine pressure ratio by opening the variable nozzle 30. The modification of the invention shown in Figure 7 effectively accomplishes this result. The addition of the spring 200 to the unit as shown in Figure 7 modifies the action to produce a signal which will cause the variable nozzle to open in substantially direct ratio to decreasing compressor efficiency as higher altitudes are reached.

Since the pressure equivalent of the spring force is constant regardless of changes in altitude and since the turbine discharge and compressor discharge pressures decrease substantially with increase in altitude, the bias provided by the spring becomes significant only at an altitude where compressor efficiency is reduced and is inconsequential at lower altitudes.

It is to be understood that the unit of Figure 7 as well as the unit of Figure 2 produce substantially linear turbine pressure ratio schedules at all altitudes. The turbine pressure ratio schedule produced by the unit of Figure 7, while still linear, is slightly different since the spring term is added to the pressure ratio term in the basic equations given above. In the unit of Figure 7

$$\Sigma Pe = P_2 + F_s/A$$

where $F_s$ is the spring force and $A$ is the effective area of the diaphragm 70. Substituting this equation into Equation 14 with the above-stated assumptions we have:

$$\frac{P_2}{P_1} = C_3 \frac{K_1}{K_2} - \frac{F_s}{P_1 A} \qquad (19)$$

Accordingly the unit will occupy its neutral or no signal position only when the pressure in the tail-pipe to which the conduit 60 is connected is less than the pressure in the chamber 76 by an amount equal to the pressure equivalent of the spring 200 and this condition can exist only so long as the nozzle opening is slightly larger than would be the case if the spring 200 were omitted as in the unit of Figure 2. It is this relatively increased nozzle area which produces a desired increase in turbine pressure ratio necessary to compensate for a decrease in compressor deficiency at high altitudes.

Figure 8 illustrates two important further modifications of the invention which may be made to modify the action in response to the unit and to render it sensitive to changes in temperatures of the fluid being controlled. Again while these modifications involve structure and principles of operation which will be of general application it is believed that their function can be best understood in relation to the control of a fluid system in the form of a turbo-jet engine as illustrated in Figure 1.

As is well known in the art, the maintenance of turbine inlet temperature is of critical importance in the operation of a turbo-jet engine, low temperatures producing loss of performance and high temperatures producing engine damage or failure. In early jet engines where compressor pressure ratio was comparatively low and the ranges of air speeds and altitudes were limited the effect of compressor inlet temperature on turbine inlet temperature was not great and the maintenance of a constant turbine pressure ratio, for example as effected by the unit of Figure 2, produced satisfactory operation. However recent developments in jet engines have made the compressor inlet temperature a significant factor, and the modified unit of Figure 8 adjusts the pressure ratio schedule accordingly.

Except for the features now to be described the unit of Figure 8 is identical to the unit of Figure 2 with respect to its construction and electrical and mechanical connections to the turbo-jet engine. In the unit of Figure 8 however the control needle 104 of Figure 2 has been replaced by a temperature sensitive needle assembly indicated generally at 202. This assembly includes a carefully contoured needle 204 threaded onto a shaft 206 in turn threadedly mounted in an elongated collar 208. The collar 208 is slidably received in a guide block 210 press fitted or otherwise suitably mounted in the lower end of chamber 78. A sealing O-ring 212 is provided to maintain a fluid tight connection. A series of bi-metallic discs 214 and spacers 216 are alternately assembled on the collar 208 between the support block 210 and shoulder 218 formed adjacent the end of the collar 208. A spring 220 is compressed between the external surface of the block 210 and a washer 222 held in place adjacent the lower end of the collar 208 by a snap ring 224. The bi-metallic discs 214 are so constructed that they become increasingly dish-shaped at all temperatures above a preselected low temperature which is equal to the lowest temperature of the fluid to which the unit will be exposed in operation. For example in a jet engine the discs will be substantially flat at a temperature of $-65°$ F. As the discs are exposed to higher temperature they become dish-shaped and urge the needle 204 into the orifice 82 in opposition to the spring 220. The contoured element 204 can be tapered uniformly or non-uniformly to match the desired engine characteristic.

In operation as applied to the turbo-jet engine of Figure 1 the effective area of orifice 82 is initially adjusted in the same manner as the needle 104 discussed above. Once adjusted it is locked in position by any suitable means. Thereafter, in the operation of the system the needle 204 effectively controls the area of the first orifice 82 as a function of the temperature of the working fluid, in the present instance the temperature of air at the discharge side of the compressor. Thus the control unit effectively produces a signal which is a function not only of the factors discussed above in connection with Figure 2 but also the temperature of the working fluid.

When the compressor discharge temperature increases over a predetermined value the needle 204 is urged by the bimetallic discs 214 into the first orifice 82. Thus the effective area of this orifice is decreased effecting a decrease in gas flow and a decrease in the pressure in chamber 76 between the first and second orifices 82 and 84. The diaphragm 70 and the needle 110 are urged by the relatively higher pressure equivalent in chamber 74 toward the chamber 76. As described above this movement produces a signal which moves the engine nozzle 30 toward open position. This action continues until the pressure in the chamber 74 is reduced to the value of the new pressure in chamber 76. The diaphragm and the associated needle 110 then return to the neutral or null position at which time a new somewhat higher turbine pressure ratio is established which will maintain the turbine inlet pressure at or below permissable maximums.

The performance and nature of response of the units of the present invention can also be significantly altered by a change in the shape of the orifices and Figure 8 also illustrates a modification which involves the replacement of the convergent second orifice 84 of Figure 2 with a convergent-divergent orifice 226.

To facilitate an understanding of this aspect of the invention it may be well to repeat a few basic considerations regarding the performance of convergent nozzles and convergent-divergent nozzles. In a convergent nozzle the velocity of the gas increases as the pressure drop across the nozzle increases until the velocity reaches sonic at the throat. A further increase in pressure drop cannot result in a further increase in throat velocity after sonic velocity is reached. The same is true of a convergent-divergent nozzle. When the throat velocity in a convergent nozzle is subsonic the pressure at the throat is always equal to the downstream pressure. In a convergent-divergent nozzle the pressure at the throat is always lower than the downstream pressure. In both the convergent nozzle and a convergent-divergent nozzle the throat pressure bears a constant relationship to the upstream pressure when the nozzles are choked. Since the control unit of the present invention and the turbo-jet engines are connected in parallel to the same upstream and downstream pressures it will be apparent that the pressure in chamber 76 between the first convergent orifice 82 and the second convergent-divergent orifice 226 will, at low velocity, be lower than the pressure in the tailpipe which has a convergent second nozzle. Also sonic velocity is achieved at a lower pressure ratio through the convergent-divergent nozzle 226 than through the convergent second nozzle 30 of the tailpipe. Accordingly pressures in the chambers 74 and 76 will be unequal until flow through the convergent nozzle of the tailpipe reaches sonic velocity at which time the pressures in the respective chambers will be equal and these pressures will remain equal as long as sonic velocity is maintained through the tailpipe nozzle. Accordingly at low speed engine operation, for example during warm up and acceleration, the pressure in the chamber 76 will be lower than the pressure in chamber 74 and the diaphragm 70 and needle 110 will be moved in a direction to move the nozzle 30 toward open position. This type of response has proved to be highly desirable in improving the acceleration characteristics of turbo-jet engines and greatly facilitates scramble or emergency take-off.

The effect of the utilization of the convergent-divergent orifice of Figure 8 is to increase the operating range in which the second orifice is choked. Accordingly the operation of the unit may be expressed in terms of Equation 16.

Figure 9 illustrates a further form of the invention containing several additional important features not included in the forms of the invention previously described. The unit of Figure 9 is generally similar in construction to the unit of Figure 2 and the units are identical with respect to their basic principles of operation.

The unit of Figure 9 comprises a main body member 240, an intermediate ring 242 and a top cover plate 244 which preferably are of cast aluminum or similar light weight material or steel sealingly secured together by a plurality of cap screws 245. The ring and cover plate are provided with threaded openings 246 and 247 respectively, for connection to appropriate pressure sources, $P_3$ and $P_2$. A pressure responsive assembly indicated generally at 248 includes an upper anular diaphragm 250 sealingly clamped between the mating flanges of the ring 242 and the cover 244 and a lower diaphragm 252 sealingly clamped between the mating flanges of the ring 242 and the main body member 240. An expansible chamber 253 is thus formed above diaphragm 250 and a chamber 254 of fixed size is formed between the diaphragms. The diaphragms 250 and 252 are of the same construction as the diaphragm 70 previously described and are secured adjacent their centers by washer assemblies 255 and 256 to a control needle unit 258. A collar 260 is provided to maintain the centers of the diaphragms in spaced relation.

The needle 258 extends downwardly successively through a chamber 262 formed at the lower side of diaphragm 252 and a central opening 264 formed in the body member 240 and is provided with a tapered portion 266 normally positioned in a convergent-divergent second orifice 268. Below the nozzle 268 the needle 258 extends outwardly through the bottom of the body member 240 and into a signal generator 270. The main body member 240 is provided with an annular chamber 272 which communicates with an external pressure source, $P_1$, through a threaded opening 274. The chamber 272 communicates through a convergent first orifice 276 with an inner cavity or flow chamber 278 formed by an annulus 279. Since there is substantially no air flow in the passage formed by needle 258 and opening 264, the pressure in chamber 278 is the same as the pressure in the chamber 262. In this form of the invention the fixed needle 104 of Figure 2 is replaced with an adjustable needle 280 provided with a divergent tip 282 positioned within the chamber 278. The needle 280 is mounted for sliding movement in a portion of the body member 240 and is normally biased into orifice closing position by a spring 284. A cam 286 rockably mounted in the body member 240 engages an enlarged portion 288 on the end of needle 280 for urging the latter into orifice enlarging position in opposition to the spring 284. Suitable linkage 290 is provided to permit remote manual or automatic control of the position of cam 286 and consequently the effective throat area of the first orifice 276. When the device of Figure 9 is used in connection with the control of turbo-jet engines the linkage will lead to the pilot's control panel. The exit side of the convergent-divergent second orifice 268 is positioned in an enlarged chamber 292 which is connected to the exterior of the unit through a threaded opening 294.

The unit of Figure 9 also includes a unique arrangement for protecting the critical components of the unit from overheating in operation, when any of the fluids with which the apparatus is used are of high temperature. The cooling system includes interconnected internal passages 296, 298, 300, 302 and 304 which are connected to ambient atmosphere for example at 306 and 308 and which lead to an integrally formed tube 310 aligned with the opening 294 which is normally connected to atmosphere. Cooling air is aspirated through the passages and conduit 310 by high pressure fluid bled from the chamber 272 through a passage 311 and a nozzle 312 positioned centrally of the conduit 310. While in the embodiment of the invention shown, the cooling passages are arranged principally to provide cooling for the lower diaphragm 252 and the area surrounding the upper end of the signal generator housing 271 it will be understood that through the provision of other cooling passages, additional or different cooling may be effected.

While the unit of Figure 9 may be used in conjunction with the electrical signal generating unit described in detail in connection with Figures 2 through 6, in some installations it is desirable to provide a control signal in the form of a fluid impulse rather than electrical impulse and the signal generator of Figure 9 has been developed for this purpose. In its simplest form the unit 270 includes a valve member 320 slidable within a valve casing 321 mounted in fixed position in the housing 271 between an upper guide member 322 and a lower plug 323. The valve casing member 321 is provided with spaced annular grooves 324, 325, 326, 327 and 328. The groove 326 is connected through conduit 329 to a suitable source of operating fluid under pressure and the grooves 324 and 328 are connected to exhaust conduit 330. The grooves 325 and 327 are connected through respective conduits 331 and 332 to the apparatus to be controlled, for example a positioning unit such as the unit 42 illustrated in Figure 1. The upper end of the valve member 320 is connected to the lower end of the needle 258 by a lever 340 fulcrumed at 342 on the guide member 322. Thus when the unit occupies its neutral or null position as shown in Figure 9, conduits 331 and 332 will be cut off from the source of pressure. When the needle 258 is displaced from its neutral position in either direction, one or the other of conduits 331 or 332 will be connected to the source of fluid pressure, the other conduit being suitably connected to exhaust. It is to be understood that the construction of the hydraulic valve is such that the resulting power signal applied through conduits 331 and 332 will be proportional in strength to the displacement of the needle 258.

While the unit of Figure 9 is of general application and may be used effectively in connection with a number of fluid systems it is believed that its advantages and mode of operation can be best illustrated by considering its function as applied to the control of the turbo-jet engine shown in Figure 1. In such an installation the chamber 253 is connected to the compressor inlet, the chamber 254 is connected to the turbine outlet and the chamber 272 is connected to the discharge side of the compressor. When so connected, the unit of Figure 9 effectively provides suitable compensation for variations in compressor inlet temperature. It is an excellent illustration of the adaptability and versatility of the units of the present invention in that the resulting compensation is essentially the same as that effected by the temperature compensated first orifice described in connection with Figure 8. In each case the units schedule an increase in turbine pressure ratio when an increase in compressor inlet temperature is sensed to maintain the level of the turbine inlet temperature at or below permissible maximums. In the unit of Figure 8 the temperature sensitive element is used to modify the force on the flow chamber side of the diaphragm while the double diaphragm assembly of Figure 9 modifies the total pressure equivalent acting in opposition to the flow chamber pressure equivalent acting in opposition to the flow chamber pressure as will now be fully explained.

It will be noted that effective area $A_1$ of the diaphragm 252 is larger than the effective area $A_2$ of the diaphragm 250. Accordingly the turbine discharge pressure in chamber 254 will be effective under all circumstances to urge the pressure responsive assembly 248 and the needle 258 downwardly supplementing the pressure in chamber 253 in opposition to the pressure in chamber 262. The net force exerted by the turbine discharge pressure will be equal to the turbine discharge pressure multiplied by the difference between the effective areas of the diaphragm 252 and 250. When the unit of Figure 9 is initially installed on a particular jet engine it is originally brought to its neutral or null position with the engine at full military r.p.m. by adjustment of the needle 280 controlling the effective throat area of the first orifice 276 in the manner described in connection with the apparatus of Figure 2. As the aircraft takes off and its air speed increases, the ram action of the low altitude air increases the compressor inlet pressure, the compressor discharge pressure and the turbine discharge pressure. So long as the temperature of the ram air remains constant all of the pressures in the unit will increase proportionally and the control unit will remain in its neutral position, the jet engine nozzle will similarly occupy a fixed position and the turbine pressure ratio will be maintained at a constant value. However, as substantial aircraft speeds are attained, the compressor inlet pressure increases more than a proportional amount because of the higher temperatures due to ram action. When this disproportionate increase exceeds a certain minimum value determined by the dead band of the unit, the pressure sensitive assembly will be moved downwardly carrying the tapered needle section 266 further into the second orifice 268 decreasing the effective area of the second orifice and increasing the pressure in chamber 262 until a balanced condition is achieved. If the range of movement exceeds the system dead band the pilot valve 320 will be moved to a position such that pressure will be supplied to conduit 331 which is so connected to an actuator as to move the variable nozzle 30 of the jet engine toward open position. As the nozzle 30 moves toward the open position the turbine discharge pressure will decrease and the temporarily relatively higher pressure in chamber 262 will move the pressure responsive assembly 248 toward its neutral position thus moving the tapered needle section 266 in a direction to increase the effective area of the second orifice 268 thereby decreasing the pressure in chamber 262. A balanced condition will again be achieved when the pilot valve 320 reaches its dead band position. When this condition is reached the engine will be operating at a new turbine pressure ratio adjusted to compensate for the change in compressor inlet temperature. It is to be understood that changes in the turbine discharge pressure will cause corrective movement of the control unit and the jet engine nozzle 30 in the same manner as described in connection with Figure 2.

It is also to be understood that as the aircraft ascends to higher altitude, the compressor inlet pressure will show a disproportionate decrease which will result in repositioning the nozzle 30 toward closed position. Such movement will increase the turbine discharge pressure until the control unit again reaches its neutral position at which time a different yet definitely scheduled value of the turbine pressure ratio will be obtained.

It is believed that it will also be helpful to consider the operation of the unit of Figure 9 in connection with the basic equations given above. As before it is assumed that both of the orifices 276 and 268 are choked so that $N_1$ and $N_2$ are unity. It is also assumed that the area of the first orifice 276 is not changed in operation so that $g(x) = C_1$. Accordingly the following relation exists:

$$\Sigma P_e = \frac{A_1 - A_2}{A_1} P_2 + \frac{A_2}{A_1} P_3 \qquad (20)$$

Since the control section 266 of the needle 258 has a simple taper, $f(y) = y$ as noted above. Accordingly by appropriate substitution into Equation 14 the following equation is obtained:

$$y = C_1 \frac{K_2}{K_1} \left[ \frac{P_2}{P_1} \left(1 - \frac{A_2}{A_1}\right) + \frac{P_3}{P_1}\left(\frac{A_2}{A_1}\right) \right] \qquad (21)$$

This equation which governs the operation of the unit when used as an indicator rather than an element of a control system as shown demonstrates that this type of unit can be used to add two or more pressure ratios. It is possible to add other pressure ratios by using additional diaphragms. It should also be noted that other items such as the spring in Figure 7 can be used for the addition of other variations. It is also possible to subtract pressure ratios with the unit of Figure 9 merely by making $A_2$ larger than $A_1$.

The function of the same unit when incorporated in the control system shown may be expressed in terms of the foregoing equations by substituting a constant, $C_N$, for $y$ in Equation 21. Equation 21, after reworking is:

$$\frac{P_3}{P_1} = \frac{K_1 C_N A_1}{K_2 C_1 A_2} - \frac{P_2}{P_1}\left(\frac{A_1}{A_2} - 1\right) \qquad (22)$$

This is the equation of a straight line with $P_3/P_1$ the ordinate $P_2/P_1$ the abscissa, and a slope $$-\left(\frac{A_1}{A_2} - 1\right)$$

Another feature of importance in the unit of Figure 9 is the remote manual adjustment for the effective area of the first orifice 276. By virtue of this adjustment, the pilot or operator of the system with which the unit is associated may change the pressure ratio schedule as desired. For example, as the effective throat area of the first orifice 276 is decreased by movement of the needle 280 to the left as viewed in Figure 9, the pressure in chamber 262 will be decreased, the pressure responsive assembly 248 will move downwardly temporarily and will be restored to the neutral or null position when the jet engine nozzle 30 has been moved to a new position corresponding to a higher turbine pressure ratio. The new pressure ratio schedule will then be automatically maintained by the unit in accordance with the operation set out above. Movement of the needle 280 in the opposite direction will cause the unit to function in a similar manner to schedule a lower turbine pressure ratio.

Another important feature of the unit of Figure 9 resides in the construction of the orifice chamber 278 and in the routing of the fluid passing from the opening 274 to the first orifice 276. With further reference to Figure 9 it will be noted that the orifice chamber 278 is formed by an annulus 279 around which the fluid passes before entering the orifice 276. It will also be noted that the first orifice is positioned at a point 180° away from the opening 274. It has been found that this construction results in a substantial decrease in the time required for the unit to reach a stabilized operating temperature particularly when coupled with the double wall construction which reduces radiation heat losses as well as conduction and convection heat losses to the outside. While this feature is of general utility it has been found to be particularly desirable in connection with the control of turbo-jet aircraft of the interceptor type which are required to go from zero to full military power in a period as short as one minute. By virtue of this construction, a temperature drop between the first and second orifices, which occurs before the unit reaches stabilized temperature, is substantially eliminated so that equation number 14 above is rendered strictly true in practice as well as in theory during initial operation of the unit. Because of the importance of achieving full rated power during emergency take-off, a heating element may be provided to heat the air between the first and second orifices during the initial stages of operation. This will result in a brief period of operation of the jet engine at power greater than full military thrust. However this would occur only before the critically stressed parts of the engine have reached objectionable temperature levels.

Figures 11 and 12 illustrate additional configurations of the control needle which may be incorporated in any of the previously described forms of the invention to provide substantially modified performance. The tapered needles in the units thus far described provide a proportional output signal, that is a displacement which is a function of a measured pressure ratio. The control needles shown in Figures 11 and 12 on the other hand produce a disproportionate or discontinuous signal and provide a snap action in both directions and a full control signal when pressure variations of a predetermined magnitude occur. Such a signal is useful for example in connection with the control of a two-position jet engine nozzle which occupies either the fully open or fully closed position. Ordinarily such a nozzle is moved only when operation of a jet engine afterburner is initiated or discontinued. In either case significant changes in the turbine discharge pressure will immediately produce the desired full control signal.

For purpose of illustration let it be assumed that the needles of Figures 11 and 12 are incorporated in the unit of the type shown in Figure 2 and that the lower end of the needle is connected to suitable apparatus effective to close a two-position nozzle when the needle is adjacent its upper limit position and to open the nozzle when the needle is adjacent its lower limit position. As before the chamber 74 is connected to turbine discharge pressure and the upstream side of the first orifice 82 is connected to compressor discharge pressure.

The needle 350 of Figure 11 has larger and smaller cylindrical sections 352 and 354, respectively, the adjacent ends of which are positioned substantially at the throat of the second orifice 84 when the control unit as a whole is in its neutral or null position. Normally the control unit does not operate in this null position but rather at either extreme of its travel. Assuming the jet engine has a normal turbine discharge pressure of 50 p.s.i. during non-afterburning operation, the control unit is initially adjusted so that the pressure in chamber 76 is, for example, 55 p.s.i. when the relatively larger section 352 of the needle 350 is positioned in the second orifice 84. Under these conditions, the differential pressure on the pressure sensitive assembly 70 maintains the assembly in the upper position against the lower end of boss 114. The jet engine nozzle will thus be moved to fully closed position. If the afterburner is ignited, the turbine discharge pressure will immediately rise to 60 p.s.i., for example, thus unbalancing the unit and moving the pressure sensitive assembly 70 and the needle 350 downwardly. The initial downward movement of the needle will not change the effective area of the orifice 84. However, when the relatively reduced section 354 enters the orifice 84 in the further downward movement of the needle 350, the effective area of the orifice is increased producing an immediate decrease in the flow chamber pressure, to 45 p.s.i. for example. This decrease in flow chamber pressure increases the downwardly effective pressure differential acting on the pressure sensitive assembly 70 and accelerates downward movement of the needle 350. The needle 350 will continue to move downwardly until the pressure sensitive assembly comes to rest against the positive stop such as the boss 116. When the needle 350 approaches or reaches its limit position a signal will be produced to move the jet engine nozzle to open position. This action will effectively reduce the turbine discharge pressure acting on the upper side of the pressure sensitive assembly 70 to a value of approximately 50 p.s.i. and reestablish the normal turbine pressure ratio. The pressure sensitive assembly 70 and the needle 350 will remain in their limit position because of the net downwardly effective pressure differential of 5 p.s.i.

If, during afterburning operation, the afterburning flame should be blown out or afterburning should be discontinued manually the turbine discharge pressure will be reduced immediately to approximately 40 p.s.i. The pressure sensitive assembly 70 and the associated needle 350 will then move upwardly initially under a differential of 5 p.s.i. The subsequent entry of the relatively enlarged section 352 of the needle into the orifice 84 will decrease the effective area of the orifice thus increasing the flow chamber pressure to its initial value of 55 p.s.i. causing the pressure sensitive assembly 70 to move upwardly with a snap action until it is arrested by the upper positive mechanical stop 114. This action will produce a control signal effective to move the jet nozzle to its fully closed position restoring the components to their initial condition.

A similar and perhaps even faster snap action will be produced by the needle shown in Figure 12 which has a section 360 of uniform diameter and a reversely tapered section 362 normally positioned adjacent the throat of the second orifice 364. The expression "reverse taper" refers to a needle the cross section of which is increased in a downstream direction.

In operation when the pressure above the diaphragm becomes greater than the flow chamber pressure the needle 360 will be moved in a downward direction. This action will immediately result in an increase in the effective area of orifice 364 producing a decrease in flow chamber pressure and thus accelerating the downward movement of the needle 360 which continues until the motion is interrupted by contact of the needle or the pressure responsive assembly with a positive mechanical stop. If the pressure above the pressure sensitive assembly becomes less than the pressure in the flow chamber, the needle 360 will move upwardly thus increasing the flow chamber pressure so that the unit will snap upwardly to a limit position again determined by a mechanical stop. The unit of Figure 12 may be used to provide the same type of control as the unit of Figure 11.

It should be noted that the needle configurations of Figures 11 and 12 produce a control which has two independent pressure ratio settings. The difference between the two settings is determined in the needle of Figure 11 by the difference in the diameters of the two needle sections 352 and 354. In the needle of Figure 12 the two pressure ratio settings are determined by the taper of the needle and the range of movement permitted by the mechanical stops. If the needle is of uniform diameter the two pressure ratio settings are the same. When such a uniform or straight needle is utilized, effective area of the orifice is unchanged during movement of the needle and the diaphragm always operates at either one extreme or the other depending upon whether the sensed pressure is above or below the flow chamber pressure. It does not provide the snap action of the needles of Figures 11 and 12 and their resultant spread in the two pressure ratio settings.

As pointed out in connection with the unit of Figure 9 the value of the condition or characteristic of the fluid controlled by the units of the present invention can be altered manually by the operator by variation of the area of the first orifice. When the unit is applied to a jet engine this construction permits the pilot to select the desired cruise nozzle opening during flight. As pointed out above enlargement of the first orifice increases the flow chamber pressure which through the operation previously described ultimately establishes a higher balancing pressure above the pressure sensitive assembly. In the case of the illustrative example given this action will produce a lower turbine pressure ratio. In certain cases it will be desirable to provide for automatic control of the effective first orifice area in addition to the fixed needle 104 of Figure 2, the manually positionable needle 280 of Figure 9 or the temperature responsive positioning means for the needle 204 of Figure 8 to provide an additional range of first orifice areas and to provide for control of the total first orifice area in response to additional parameters. An example of this type of unit is illustrated diagrammatically in Figure 10.

Certain of the basic components of the unit of Figure 10 are the same as those shown in Figure 2 in detail and will be given the same reference numerals. In addition to these components, the unit of Figure 10 includes a by-pass conduit 370 which connects the flow chamber 76 with the fluid supplied to the first orifice 82 at a point upstream of this orifice. A shut-off valve 372 provided in the conduit 370 is preferably spring biased to the fully closed position and is opened by a solenoid 374. The flow of fluid through conduit 370 into the flow chamber 76 when the valve 372 is opened is regulated by a needle 376 which extends into a third orifice 378. The construction of the needle 376 and orifice 378 may be identical with the needle 104 and orifice 82. When the valve 372 is opened, additional fluid is permitted to flow into the flow chamber 76 thus raising the pressure in the chamber. The resulting action will be the same in principle as that effected by enlarging the first orifice through the operation of the manually controlled needle of Figure 9 or the temperature responsive needle of Figure 8. This form of the invention has been found to have particular unity in connection with the control of turbo-jet engines equipped with afterburners of advanced form. In such engines it has been found that efficient operation can be effected with a turbine pressure ratio during afterburning which is significantly different from the turbine pressure ratio during periods of non-afterburning. Thus, in practice the desired non-afterburning turbine pressure ratio will be set by adjustment of the needle 104 as described in connection with the unit of Figure 2 and the afterburning turbine pressure ratio will be established by similar adjustment of the needle 376. If the solenoid 374 is then made operative in response to initiation of afterburning, the pressure ratio shift will be automatically effected when afterburning is initiated or terminated. It will be apparent that the operation of the solenoid in this manner can be effected in a number of conventional ways and since this connection forms no part of the present invention it will not be described in detail.

The incorporation of the additional orifice 378 merely changes the value of $g(x)$ in Equation 14 given above or of $C_1$ in Equation 16.

All forms of the invention thus far described are effective to sense, indicate and control in accordance with linear schedules. In many applications, however, it is necessary to establish a non-linear variation between one variable or set of variables and another variable or set of variables. For example, in the control of gas turbines, it is sometimes necessary to schedule one pressure ratio against another along a non-linear curve. A unit developed specifically for this purpose is shown in Figures 13, 14 and 15 to which reference will now be made.

Essentially, the unit shown in Figure 13 comprises two basic units of the type shown in Figure 2 so arranged that the control needle of one of the units effectively varies the area of a first orifice of the other unit. In Figure 13 the two basic units are indicated generally at 400 and 402, respectively. The primary unit 400 comprises a body member 404 having an annular flange 406 and an integral center section 408 having a straight through opening 410. The radially extending flange 412 of an insert 414 and the rim of a flexible diaphragm 416 of the same construction as diaphragm 70, for example, are clamped between the flange 406 and a mating flange 418 of a top cover member 420 by a plurality of cap screws 422. The diaphragm 416 is secured by a washer and nut assembly, indicated generally at 424, to the upper end of the control needle 426 provided with a tapered control section 428 extending through a convergent-divergent orifice 430 formed in a cast housing assembly 432 secured by suitable bolts, not shown, to the body member 404.

The top cover member 420 is provided with an opening 434 into which is threaded a conduit 435 connecting the exterior of the device with the chamber 436 formed at the upper surface of the diaphragm 416. The space 438 formed about the lower surface of diaphragm 416 is in communication through opening 410 with the reference pressure chamber 439 formed between the second orifice 430 and the first orifice 440 formed in the central portion 408 of the body member 404 and an additional "first" orifice 441 formed in a fitting 442 mounted in the body member 404. Fluid may be supplied to the upstream side of orifice 440 through a conduit 443 threaded into opening 444 formed in the body member 404. As in previously described units, the effective area of the first orifice 440 is controlled by a calibration needle 446 threaded into a fitting 448 mounted in the body member 404. Suitable passages 450 for cooling air are formed between the insert 414 and the body member 404. The cooling air may be aspirated through the device by means similar to that shown in Figure 9 or other convenient means not shown in Figure 13.

Secured to the lower end of the control needle is a pilot valve 452 having lands 454 and 456 slidably received within a sleeve 458 rigidly mounted in an opening 460 formed centrally of a housing extension 462 secured by bolts or other suitable means not shown to the lower end of the housing assembly 432. The lower end of the housing extension 462 is closed by a plug 464 held in place by a snap ring 466. The housing extension 462 is in open communication with the area at the downstream side of orifice 430 and is connected to atmosphere through an opening 468. The housing extension 462 is also provided with communicating passages 470 and 472 which communicate, respectively, with a chamber 474 formed in housing assembly 432 and with the interior of sleeve 458. The chamber 474 in turn is in communication with the chamber formed in body member 404 at the upstream side of orifice 442 through a plurality of openings 476 (one shown) so that the fluid flowing through inlet 444 is supplied to the pilot valve 452. The pilot valve sleeve 458 is provided with annular grooves 478 and 480 in communication with the interior of the sleeve 458 and also connected through suitable passages 482 and 484, respectively, to conduits 486 and 488 leading to the exterior of the device.

The secondary unit 402 comprises a main housing assembly 500 suitably secured by cap screws 501 (Fig. 14) to a flange 502 formed on the housing assembly 432 of the main unit 400. The opposite end of the housing assembly 500 is provided with an attaching flange 503 to which a dish-shaped annulus 504, a ring 506 and a flange 508 of a top cover member 510 are sealingly secured as by cap screws 509. The outer peripheries of diaphragms 512 and 514 are clamped between the flange 508 and the ring 506, and the ring 506 and the annulus 504, respectively. The inner peripheries of the diaphragms 512 and 514 are secured as by a nut and washer assembly 516 to a control needle 518 which extends through an opening 520 formed in a fitting 522 mounted in the housing assembly 500. A nut 524 holds the inner periphery of the annulus 504 in similar relation with the fitting 522 in spaced relation with adjacent portions of housing 500 to form cooling air passages 526 which communicate with the low pressure area in the primary unit 400 through a passage 528 shown partially in Figure 15. Sheet metal diaphragm guides 530 and 532 are secured by the nut and washer assembly 516 in position to support the respective diaphragms 512 and 514. Because of the relative sizes of the support members 530 and 532, the effective area of diaphragm 512 is less than the effective area of diaphragm 514 so that the same relationship exists as explained in detail in connection with the unit of Figure 9. The deep convolutions of the diaphragms 512 and 514 are supported by the parallel and concentric surfaces of the guides 530 and 532 and the adjacent body members to eliminate changes in the effective area of the diaphragm through their range of movement.

The diaphragms 512 and 514 thus establish three separate pressure chambers within the secondary unit 402. The chamber 536 formed between the diaphragm 512 and the top cover member 510 is in communication with the exterior of the device through a conduit 537 threaded into opening 538. The chamber 540 between the two diaphragms communicates by means of a conduit 541 with the annular chamber 542 formed in the housing assembly 500 which in turn is in free communication with the annular chamber 474 formed in the housing assembly 432 of the primary unit 400. The chamber 546 communicates through opening 520 with orifice chamber 548 formed between a convergent-divergent second orifice 550 and a first orifice 552, each formed integrally in housing 500. A manually adjustable calibration needle 554 is threaded into a fitting 556 mounted in housing assembly 500 and adjustably controls the effective area of the first orifice 552, the upstream side of which is subjected to the pressure in the annular chambers 542 and 474. A fitting 558 is suitably mounted on housing assembly 500 and is provided with an integral conduit section 560 which extends into an opening 562 in the wall of chamber 440.

The control needle 518 is provided with a tapered portion 564 which controls the effective area of the second orifice 550 of the unit 402 and is provided with a reversely tapered end portion 566 which controls the effective area of the second first orifice 441 of the primary unit 400.

The compound unit of Figures 13, 14 and 15 has many practical applications. One of these, which illustrates the operation of the device, is shown diagrammatically in Figure 16. In this case the compound unit is utilized to control an air bleed valve at the discharge side of the compressor of a gas turbine unit to limit the bleed flow to a value consistent with the power output of the turbine unit while maintaining turbine inlet temperatures at or below design maximums and taking into account variations in compressor output characteristics under varying ambient conditions.

In the system shown in Figure 16, the compound control unit controls the bleed flow at a prescheduled rate as determined by the value of the compressor pressure ratio. The bleed air flow is measured as a function of the ratio of the total and static pressures in the bleed air duct. Referring more specifically to Figure 16 a housing 570 encloses a compressor 572 and a turbine 574 mounted in accordance with conventional practice on a common shaft 576 upstream and downstream, respectively, of the combustion chamber 578. A duct 580 connects the space at the compressor discharge to exhaust. A valve 582 is provided in duct 580 to control the quantity of air bled from the system. While the valve may take a number of conventional forms, in the instant case it is constructed so as to be operated by a pneumatically operated actuator 583 controlled by air supplied by the control unit of Figure 13 through the conduits 486 and 488 connected respectively to the passages 482 and 484. The chamber 436 of the primary unit 400 is connected to the bleed conduit 580 by the conduit 435 arranged to supply the static pressure within the conduit 580 to the chamber 436. The total pressure in the conduit 580 is supplied to the unit 400 through the opening 444 by the conduit 443. The same pressure is supplied to the upstream side of the additional orifice 441 of the unit 400 and to the first orifice 552 of the secondary unit 402. The conduit 537 supplies total pressure at the compressor inlet to the chamber 536 of the secondary unit 402 through opening 538. When so connected the unit senses compressor pressure ratio and the ratio of static pressure to total pressure in the duct 580.

For purposes of describing the operation of the system of Figure 16 let it be assumed that the unit has been operating in balance and that the bleed air flow increases beyond the desired value. When this occurs, the static pressure applied to conduit 435 tends to decrease in relation to the total pressure in the duct applied to conduit 443. This produces an upward movement of the pressure sensitive assembly 424 causing the control portion 428 of the needle to move upwardly to increase the effective area of the second orifice 430 of the primary unit 400. The upward movement continues until the pressure in the flow chamber is reduced to a value which is equal to the static pressure applied through conduit 435 to the upper side of the diaphragm 416. At this displaced position the valve 452 is moved upwardly exposing the port areas of the sleeve 458 in such a manner as to admit pressure from the annular passage 474 through conduit 486 to the valve actuator 583. Simultaneously, the conduit 486 is vented to ambient pressure. The pneumatically controlled air valve 582 is moved in a closing direction reducing the bleed air flow from the compressor discharge through the conduit 580.

Thus far it has been assumed that the value of the compressor pressure ratio is constant. However the compressor pressure ratio changes as a function both of bleed air flow and ambient air temperature. In order to establish the desired schedule of bleed air flow it is necessary to modify the pressure ratio setting of the primary unit 400 as a function of compressor pressure ratio. The secondary unit 402 performs this function and biases the setting of the primary unit 400 along a predetermined scheduled relationship between compressor pressure ratio and the ratio of the total air bleed pressure to the static air bleed pressure. Any decrease in the compressor pressure ratio is analogous to a disproportionate increase in the compressor inlet pressure applied through conduit 537 to the chamber 536 in the unit 402. Thus, a decrease in compressor pressure ratio moves the pressure sensitive assembly 516 to the right and an increase in compressor pressure ratio moves the diaphragm assembly to the left. The function of the secondary unit 402 is analogous to and may be described by Equation 14. The control portion 566 of the needle 518 determines the degree to which the pressure ratio setting of the primary unit is biased for a given displacement of the needle 518. For example, in the arrangement illustrated in Figure 13, a decrease in the compressor pressure ratio increases the effective area of the orifice 441 thus increasing the pressure in chambers 440 and 438 of the unit 400. As a result the diaphragm 416 and the needle 426 are moved upwardly to move the valve 582 in a closing direction to decrease the air flow through the conduit 580. As the air flow is decreased the static pressure in conduit 435 is increased in relation to the total pressure in the conduit 443 causing the diaphragm 416 to be moved downwardly until the ports of the valve 452 are closed and the motion of the air valve 582 is arrested. At this condition, the equilibrium of the system is restored, the valve 582 is stationary, the diaphragm 416 is balanced and operating at the null position but at a new pressure ratio determined by the magnitude of the displacement of the secondary unit 402.

Compound units of the type shown in Figures 13, 14 and 15 can also be used to multiply and divide as well as to follow non-linear schedules. A compound unit for performing multiplication is shown diagrammatically in Figure 17. This unit includes two units 600 and 602 which may be of the same general construction as the unit of Figure 2. The primary unit 600 has a first orifice 604 and a second orifice 606 between which the orifice chamber 608 is formed. The control needle 610 is provided with a tapered control section 612 extending through the second orifice 606 and is connected to the pressure sensitive assembly 614. The projecting end of the needle 610 is provided with a pointer 615 which cooperates with a scale 617 to indicate the position of the needle. An independent pressure chamber 616 is formed around the upper side of the pressure sensitive element 614. The effective area of the first orifice 604 of the primary unit 600 is controlled by a tapered section 618 of the control needle 620 secured to and movable with the pressure sensitive assembly 622 of the secondary unit 602. A second tapered portion 624 on the control needle 620 regulates the effective area of the second orifice 626 of the secondary unit 602. The orifice chamber 628 of the unit 602 is formed between the second orifice 626 and the first orifice 630, the effective area of the latter being adjusted by a calibration needle 632 similar to the needle 104 of Figure 2. An independent pressure chamber 634 is formed at the side of the pressure sensitive assembly 622 opposite the orifice chamber 628.

The operation of the device will now be considered assuming that a pressure $P_1$ is supplied to orifice 618, a pressure $P_2$ supplied to chamber 616, a pressure $P_3$ applied to orifice 630 and a pressure $P_4$ applied to chamber 634. In the following formulae the reference numerals applied to Figure 17 will be used as subscripts.

It may be assumed that $g(x_{602})=C_{602}$, $f(y_{602})=Ky_{602}$, $g(_{600})=Kx_{600}$ and $f(y_{600})=Ky_{600}$. It is further assumed that all of the orifices are choked. With respect to unit 602, $\Sigma P_{e602}=P_4$. Accordingly $$y_{602} = C_{602} \frac{K_{626}}{K_{630}} \frac{P_4}{P_3} \qquad (23)$$

Similarly for the unit 600

$$y_{600} = x_{600} \frac{K_{606}}{K_{604}} \frac{P_2}{P_1} \qquad (24)$$

Since $x_{600}$ is equal to $y_{602}$, substitution of Equation 23 into Equation 24 will produce the following equation:

$$y_{600} = C_{602} \frac{K_{626}}{K_{630}} \frac{K_{606}}{K_{604}} \frac{P_2}{P_1} \frac{P_4}{P_3} \qquad (25)$$

This equation shows that the displacement, $y_{600}$, of the second control needle 610 is a function of the product of the two pressure ratios $P_2/P_1$ and $P_4/P_3$. In operation, the control needle 620 of the secondary unit 602 will have a definite position for each value of the pressure ratio $P_4/P_3$. As this pressure ratio changes, the position of the needle 620 will change which in turn changes the area of the first orifice 604 of the primary unit 600. Since $P_1$ and $P_2$ have not changed the needle 610 of the primary unit 600 will move to return the orifice area ratio $a_{n604}/a_{n606}$ to its original value. Thus the needle 610 will assume a new position depending on the new value of the pressure ratio product. If the scale 617 is properly calibrated, the device of Figure 17 will produce a direct indication of the product of the two pressure ratios involved.

The division process is very similar to multiplication, and the unit of Figure 17 may be modified to perform the division process by reversing the taper of the section 618 on the needle 620. Accordingly $g(x_{600})=C_{600}/x_{600}$ where $C_{600}$ depends upon the taper of the control needle. Substitution in the equation given above with the assumptions stated in connection with Figure 17 produces the following equation:

$$y_2 = \frac{C_{600}}{C_{602}} \frac{K_{630}}{K_{626}} \frac{K_{606}}{K_{604}} \frac{P_2/P_1}{P_4/P_3} \qquad (26)$$

This equation demonstrates that the unit of Figure 17 provided with a reversely tapered needle control portion 618 can be used for division. The operation of the division unit is the same as that described for the multiplication unit of Figure 17.

A practical application of the above-described unit arranged for performing division is the measurement of the engine pressure ratio of a turbo-jet engine of the type shown in Figure 1. The engine pressure ratio is the turbine discharge pressure divided by the compressor inlet pressure. Measurement of this ratio is of increasing importance in providing reliable thrust indication particularly in connection with multiple spool turbo-jet engines. The pilot, knowing optimum pressure values, can at any time determine whether his engine or engines are delivering the required power and can make the necessary adjustments to provide optimum performance.

This pressure ratio cannot be sensed conveniently with a unit of the type shown in Figure 2 because the gas at the turbine discharge is too hot to bleed through the unit orifices and the compressor inlet pressure is too low to choke the orifices. In the compound device, the secondary unit 602 senses compressor pressure ratio, that is compressor inlet pressure divided by compressor discharge pressure, and the primary unit 600 senses turbine pressure ratio, that is, turbine discharge pressure divided by compressor discharge pressure. The compressor discharge air is supplied to the first orifices 630 and 604 of both units. In this example $P_3=P_1=$compressor discharge pressure, $P_2=$turbine discharge pressure and $P_4=$compressor inlet pressure. Equation 23 may be then rewritten as follows:

$$y_{600} = \frac{C_{600}}{C_{602}} \frac{K_{630}}{K_{626}} \frac{K_{606}}{K_{604}} \frac{P_2}{P_4} \qquad (27)$$

This equation demonstrates that the displacement $y_{600}$, of the needle 610 is a function of the engine pressure ratio. It will be understood that this displacement can be used to operate a dial either directly or remotely by the use of a selsyn or an equivalent.

The units of the present invention may also be utilized to differentiate or integrate pressure ratios. A unit for differentiating $P_2/P_1$ with respect to time is shown in Figure 18. The basic unit 640 may be of essentially the same construction as the unit of Figure 2. The pressure sensitive assembly 642 divides the unit into upper and lower independent pressure chambers 644 and 646, respectively, the former being supplied with a pressure $P_2$ and the latter reflecting the pressure developed between the first orifice 648 and the second orifice 650. The control needle 652 attached to and movable with the pressure sensitive assembly 642 is provided with a straight section extending through the second orifice 650 so that displacement of the needle 652 does not vary the effective area of the orifice 650.

The effective area of the first orifice 648 is controlled by a reversely tapered section 654 on a needle 656 pivotally secured at its opposite end to a lever 658 fulcrumed at 660. The lower or free end of needle 652 is operatively connected to the input element of an integrator indicated generally at 662. The integrator may be of conventional construction. A wide variety of such integrators are discussed in the book Analog Methods in Computation and Simulation by Walter W. Soroka. The output element 664 of the integrator is connected to the lever 658 whereby longitudinal displacement of the element 664 produces displacement of the control needle 656 by an amount dependent on the position of the fulcrum 660.

In considering the operation of the device of Figure 18 let it be assumed that both orifices are choked so that $N_1 = N_2 = 1.0$, that there is no taper on the needle 652 so that $f(y) = $ a constant, for example $C_0$, and that the taper on the control section 654 of the needle 656 is such that $g(x) = 1/x$. The only applied pressure equivalent is $P_2$ so that $\Sigma P_e = P_2$. Substitution of these assumptions and observations into Equation 14 gives the following equation:

$$C_0 = \frac{1}{x} \frac{K_2}{K_1} \frac{P_2}{P_1} \qquad (28)$$

The output, $x$, of the integrator 662 is related to the input, $y$, by the equation:

$$x = K \int y \, dt \qquad (29)$$

Substituting Equation 29 into Equation 28 and rearranging, the following equation is derived:

$$\int y \, dt = \frac{1}{C_0 K} \frac{K_2}{K_1} \frac{P_2}{P_1} \qquad (30)$$

If Equation 30 is differentiated with respect to time the following result is obtained:

$$y = \frac{1}{C_0 K} \frac{K_2}{K_1} \frac{d(P_2/P_1)}{dt} \qquad (31)$$

This equation demonstrates that the displacement, $y$ of the needle 652 is a function of the derivative with respect to time of the pressure ratio $P_2/P_1$. In other words, the needle 652 is displaced an amount proportional to the rate at which the input pressure ratio $P_2/P_1$ is changed. The lower or free end of the needle 652 may read directly on a scale 666, or, through a lever system and gear train the movement of the needle may be converted to pointer rotation.

When two differentiating units of the type shown in Figure 18 are combined and the two outputs are divided mechanically or in other ways, the derivative of one pressure ratio with respect to another pressure ratio may be obtained as a part of what is commonly referred to as an "optimallizing" control. The "rate of change of pressure ratio" signal obtained from the differentiating unit of Figure 18 finds more common usage in conventional servo control systems such as the variable nozzle controls to provide improved system stability.

The form of the invention shown in Figure 18 may be used as an integrator simply by substitution of a differentiator of standard construction for the integrator 662, as shown. The differentiator may be of any type so long as the relation $x = K \, dy/dt$ is satisfied.

The same assumptions and observations made with respect to the differentiation unit apply equally to the integration unit and when substituted into Equation 14 produce Equation 28. Substituting the equation for the differentiator, that is $x = K \, dy/dt$ into Equation 28 and rearranging the following equation results.

$$\frac{dy}{dt} = \frac{1}{C_0 K} \frac{K_1}{K_2} \frac{P_2}{P_1} \qquad (32)$$

Multiplying both sides of Equation 32 by $dt$ and integrating with respect to time the following equation results:

$$y = \frac{1}{C_0 K} \frac{K_2}{K_1} \int \left(\frac{P_2}{P_1}\right) dt \qquad (33)$$

This equation demonstrates that the displacement, $y$, is a function of the integral of the pressure ratio $P_2/P_1$ with respect to time. Stated in other terms, the equation demonstrates that the position of the needle 652 continues to change as long as an error exists in the sensed pressure ratio. Thus the position of the needle is a function of both the magnitude of the pressure ratio error and the length of time for which the error exists. As with the differentiation unit, this system may be used in servo-systems to improve certain system characteristics.

In all of the forms of the invention disclosed above it has been assumed, primarily for simplicity, that both orifices of the units are choked in operation. However, it should be understood that this is not a pre-requisite for satisfactory or useful operation of the units of the present invention. This may be demonstrated by reference to the system of Figure 19 which illustrates diagrammatically the application of the control unit of the present invention to the measurement of a temperature ratio in a duct.

Referring now more specifically to Figure 19, 670 indicates a duct having upstream and downstream restrictions 672 and 674, respectively, between which fuel is injected through a conduit 676. The control unit of the invention which is indicated generally at 678, may in practice take the form of the unit of Figure 2. The pressure chamber 680 at the upper surface of the pressure sensitive assembly 682 is connected to the duct 670 between the restrictions 672 and 674. As in the units previously discussed, the reference pressure chamber 684 is formed between the first orifice 686, the effective area of which is controlled by a tapered needle 688 and a second orifice 690 the effective area of which is controlled by a tapered section 692 of the control needle 694. A pointer 696 on the end of needle 694 cooperates with a scale 698 to indicate the position of the needle. The upstream side of the first orifice 686 is connected to the duct 670 ahead of the first restriction 672 and the downstream side of the second orifice 690 is connected to the duct 670 at a point downstream of the restriction 674. In the following equations governing the operation of this system, $P_1$ is the pressure supplied to the first orifice 686, $P_2$ is the pressure supplied to the chamber 680 and $P_3$ is the pressure at the downstream side of the second orifice 690. $T_1$ is the temperature of the air entering the system and $T_2$ the temperature of the gas entering restriction 674. The area of restriction 672 is $a_1$ and the area of restriction 674 is $a_2$. The equation for the flow through the restriction 672 is:

$$Wa_{672} = K_{672} \frac{P_1}{\sqrt{T_1}} a_1 N_{1D} \qquad (34)$$

The flow through restriction 674 is given by the formula $$Wa_{674} = K_{674} \frac{P_2}{\sqrt{T_2}} a_2 N_{2D} \qquad (35)$$

For steady flow these two air rates are equal. Equating Equations 34 and 35 and re-arranging, the following equation results $$\frac{P_2}{P_1}=\frac{a_1}{a_2}\frac{K_{672}}{K_{674}}\frac{N_{1D}}{N_{2D}}\sqrt{\frac{T_2}{T_1}} \tag{36}$$

Since the needle 688 in the first orifice 686 is not moved in operation and the control section 690 on the needle 692 has a simple taper, the functions $g(x)$ and $f(y)$ are $C_1$ and $K_y$ respectively as before. In the system shown $\Sigma P_e = P_2$. Substitution of these quantities into Equation 14 gives the following equation:

$$y=\frac{C_1}{K}\frac{K_2}{K_1}\frac{N_2}{N_1}\frac{P_2}{P_1} \tag{37}$$

Substitution of Equation 36 into Equation 37, since the pressure ratios in each are identical, gives $$y=C_2\frac{K_2}{K_1}\frac{N_2}{N_1}\frac{a_1}{a_2}\frac{K_{1D}}{K_{2D}}\frac{N_{1D}}{N_{2D}}\sqrt{\frac{T_2}{T_1}} \tag{38}$$

where $C_2=C_1/K$. As stated above the quantity N for an orifice is primarily a function of the pressure ratio across the orifice. For equilibrium operation $P_r=P_2$. Accordingly $P_1/P_2=P_1/P_r$ and $P_2/P_3=P_r/P_3$. $P_1/P_r$ and $P_r/P_3$ are the pressure ratios applied, respectively, across the orifices 686 and 690 of the control unit of Figure 19. Since, for practical purpose $N=f$ (pressure ratio only) it will be seen that $N_1=N_{1D}$ and $N_2=N_{2D}$. Accordingly the N factors cancel out of Equation 38 thus giving a final equation as follows:

$$Y=C_2\frac{K_2}{K_1}\frac{K_{1D}}{K_{2D}}\frac{a_{1D}}{a_{2D}}\sqrt{\frac{T_1}{T_2}} \tag{39}$$

which can be written $$y=f\left(\frac{T_1}{T_2}\right) \tag{40}$$

These equations demonstrate that the displacement, $y$, of the needle is a function of the temperature ratio in the duct. This system is particularly useful for measuring a temperature $T_2$ which is sufficiently high to damage any probes or thermocouples placed in the duct. It will be apparent from Figure 19 that the fluid at the temperature $T_2$ does not enter the measuring unit or system at any point and measurement of the temperature $T_2$ may be effected only by measurement of the lower temperature $T_1$ and the temperature ratio $T_2/T_1$.

This application is a continuation-in-part of copending application Serial No. 376,337, filed August 25, 1953, and application Serial No. 483,143, filed January 6, 1955, and now abandoned.

I claim:

1. A differential pressure responsive unit comprising a pair of independent pressure responsive elements, means forming respective independent chambers about the opposite surfaces of each of said elements; means forming an inlet orifice and an outlet orifice in series in each of the respective chambers at one side of each of said elements; means for connecting each of said inlet orifices to a first source of compressible fluid under variable pressure and the remaining chambers, respectively, to second and third sources of compressible fluid under variable pressure; means movable with one of said element to vary the area of the inlet orifice in the chamber associated with the other of said elements upon displacement of said one of said elements; and a signal element attached to said other of said elements and extending through one of said orifices to provide an external indication of the direction and magnitude of the displacement of said other pressure responsive element.

2. The unit according to claim 1 together with means movable with one of said elements to vary the area of the outlet orifice in the chamber associated with one of said elements upon movement of said one of said elements.

3. A differential pressure responsive unit comprising a pair of independent pressure responsive elements; means forming respective independent chambers about the opposite surfaces of each of said elements; means forming an inlet orifice and an outlet orifice in series in each of the respective chambers at one side of each of said pressure responsive elements; means for connecting each of said inlet orifices to a first source of compressible fluid under variable pressure and the remaining chambers, respectively, to second and third sources of compressible fluid under variable pressure; a control needle movable with one of said pressure responsive elements and having tapered control portions extending through and controlling the effective area of the outlet orifice of one of said chambers and the inlet orifice of another of said chambers; and a signal element attached to and movable with the other of said pressure responsive elements and extending through one of said orifices to provide an external indication of the direction and magnitude of the displacement of said other pressure responsive element.

4. A differential pressure responsive unit comprising a pair of independent pressure responsive elements; means forming independent static pressure chambers at one side of each of said elements; means forming independent flow chambers at the opposite side of each of said elements; means forming an inlet orifice and an outlet orifice in series in each of the respective flow chambers at one side of each of said pressure responsive elements; means for connecting each of said inlet orifices to a first source of compressible fluid under variable pressure and the remaining chambers, respectively, to second and third sources of compressible fluid under variable pressure; means for connecting the outlet orifices to a relatively low pressure area; a first control needle movable with one of said pressure responsive elements and having tapered control portions extending through and controlling the effective area of an orifice of one of said flow chambers and an orifice in the other of said flow chambers; a second control needle movable with the other pressure responsive element having a tapered control portion extending through and controlling the effective area of an orifice in the other flow chamber; and a signal element attached to and movable with said second control needle externally of said chambers to provide an indication of the direction and magnitude of the displacement of the pressure responsive element with which said second needle moves.

5. A differential pressure responsive unit for maintaining a ratio between a first variable pressure source and a second variable pressure source as a function of the ratio between the pressure at said first variable source and pressure at a third variable source comprising, a pair of independent pressure responsive elements; means forming independent static pressure chambers at one side of each of said elements; means forming independent flow chambers at the opposite side of each of said elements; means forming an inlet orifice and an outlet orifice in series in each of the respective chambers at one side of each of said pressure responsive elements; means for connecting each of said inlet orifices to said first pressure source; means for connecting each of said outlet orifices to a relatively low pressure area; means for connecting one of said static pressure chambers to said second pressure source; means for connecting the other of said static chambers to said third pressure source; a first control needle movable with one of said pressure responsive elements and having tapered control portions extending through and controlling the effective area of an orifice of one of said flow chambers and an orifice in the other of said flow chambers; a second control needle movable with the other pressure responsive element having a tapered control portion extending through and controlling the effective area of an orifice in the other flow chamber; a control element attached to and movable with said second control needle externally of said chambers; and means responsive to the movement of said element to control the magnitude of the pressure at at least one of said first and second sources.

References Cited in the file of this patent

UNITED STATES PATENTS

| | | |
|---|---|---|
| 531,182 | Hain | Dec. 18, 1894 |
| 787,136 | Warren | Apr. 11, 1905 |
| 1,025,251 | Desmond | May 7, 1912 |
| 2,438,663 | Greenland | Mar. 30, 1948 |
| 2,457,595 | Orr | Dec. 28, 1948 |
| 2,641,105 | Drake | June 9, 1953 |
| 2,645,240 | Drake | July 15, 1953 |
| 2,706,885 | Ostroff et al. | Apr. 26, 1955 |
| 2,736,166 | Mock | Feb. 28, 1956 |
| 2,746,242 | Reed | May 22, 1956 |
| 2,775,231 | Silver | Dec. 25, 1956 |
| 2,804,084 | Greenland | Aug. 27, 1957 |
| 2,848,869 | Russ | Aug. 26, 1958 |
| 2,864,393 | Drake | Dec. 16, 1958 |

FOREIGN PATENTS

| | | |
|---|---|---|
| 278,689 | Germany | Oct. 2, 1914 |

UNITED STATES PATENT OFFICE
CERTIFICATION OF CORRECTION

Patent No. 2,981,058                        April 25, 1961

Wendell E. Reed

It is hereby certified that error appears in the above numbered patent requiring correction and that the said Letters Patent should read as corrected below.

Column 3, lines 61 to 63, add -- N -- to the right-hand side of equation (1); column 4, line 46, for "and" read -- an --; lines 66 to 68, the equation should be numbered -- (11) --; column 5, lines 23 to 25, equation (13) should appear as shown below instead of as in the patent:

$$-\frac{1}{a_{n_1}} = g(x)$$

column 8, line 54, for "some" read -- same --; column 15, lines 28 and 29, strike out "equivalent acting in opposition to the flow chamber pressure"; column 27, lines 63 and 64, for "element" read -- elements --.

Signed and sealed this 24th day of October 1961.

(SEAL)
Attest:

ERNEST W. SWIDER
Attesting Officer

DAVID L. LADD
Commissioner of Patents